United States Patent
O'Brien et al.

(10) Patent No.: US 12,242,467 B2
(45) Date of Patent: *Mar. 4, 2025

(54) SYSTEMS AND METHODS FOR DISTRIBUTED LEDGER-BASED DATA EXCHANGE

(71) Applicant: OMNY, Inc., Atlanta, GA (US)

(72) Inventors: Sean Christopher O'Brien, Atlanta, GA (US); Maik Andre Lindner, Roswell, GA (US); Alexis Jorge Liatis, Decatur, GA (US); Alan Michael Pohl, Doraville, GA (US)

(73) Assignee: OMNY, Inc., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/492,255

(22) Filed: Oct. 23, 2023

(65) Prior Publication Data

US 2024/0078226 A1 Mar. 7, 2024

Related U.S. Application Data

(63) Continuation of application No. 17/302,806, filed on May 12, 2021, now Pat. No. 11,797,524.

(Continued)

(51) Int. Cl.
*G06F 16/00* (2019.01)
*G06F 16/23* (2019.01)
(Continued)

(52) U.S. Cl.
CPC ...... *G06F 16/2379* (2019.01); *G06F 21/6245* (2013.01); *H04L 9/3236* (2013.01)

(58) Field of Classification Search
None
See application file for complete search history.

(56) References Cited

U.S. PATENT DOCUMENTS 10,878,124 B1 * 12/2020 Sitaraman .............. G06N 5/047
11,797,524 B2    10/2023 O'Brien et al.
(Continued)

OTHER PUBLICATIONS

"5 Important Regulations in United States Healthcare," Maryville University, Web page <https://online.maryville.edu/blog/5-important-regulations-in-united-states-healthcare/>, Aug. 6, 2020, retrieved from Internet Archive Wayback Machine <https://web.archive.org/web/20200806135139/https://online.maryville.edu/blog/5-important-regulations-in-united-states-healthcare/> on Aug. 16, 2021.

(Continued)

*Primary Examiner* — Anhtai V Tran
(74) *Attorney, Agent, or Firm* — André J. Bahou; Kristen Strickland; Bradley Arant Boult Cummings LLP

(57) ABSTRACT

A computer-readable storage medium may include executable instructions stored thereon that, when executed by a processor, may be configured to establish a connection to a node of a distributed ledger network that maintains a distributed ledger. The processor may obtain a first dataset from a first user, perform pre-processing on the first dataset to obtain a first data asset based on the first dataset, and store the first data asset. The processor may calculate a first value for the first data asset and generate a first data proposition based on the first data asset. The processor may obtain acceptance data from a second user, which may include data indicating acceptance by the second user of the first data proposition. The processor may transmit a first distributed ledger record to the node of the distributed ledger network.

20 Claims, 11 Drawing Sheets

Related U.S. Application Data

(60) Provisional application No. 62/704,541, filed on May 14, 2020.

(51) Int. Cl.
  G06F 21/62 (2013.01)
  H04L 9/32 (2006.01)

(56) References Cited

U.S. PATENT DOCUMENTS

| | | | | |
|---|---|---|---|---|
| 2019/0332807 | A1* | 10/2019 | LaFever | G06F 21/6254 |
| 2020/0327978 | A1* | 10/2020 | Fower | H04L 9/14 |
| 2021/0083872 | A1* | 3/2021 | Desmarais | H04L 9/3247 |
| 2021/0357388 | A1 | 11/2021 | O'Brien et al. | |

OTHER PUBLICATIONS

Birkett, Alex, "A Subscription Pricing Strategy that Works," Web page <https://cxl.com/blog/constucting-pricing-strategy-for-subscription-products/>, May 3, 2020, updated Aug. 3, 2020, retrieved on Aug. 16, 2021.
Bozenhardt, Erich H., et al., "Are You Asking Too Much From Your Filler?" Pharmaceutical Online, Web page <https://www.pharmaceuticalonline.com/doc/are-you-asking-too-much-from-your-filler-0001>, Oct. 18, 2018, 2018, retrieved Aug. 16, 2021.
"BTPO (Brand Price Trade Off)," B2B International, Web page <https://www.b2binternational.com/research/methods/pricing-research/bpto/>, Sep. 28, 2020, retrieved from Internet Archive Wayback Machine <https://web/archive.org/web/20200928221221/https://www.b2binternational.com/research/methods/pricing-research/bpto/> on Aug. 16, 2021.
"Data is a business asset beyond imagination—here is why (and where)," i-Scoop, Web page <https://www.i-scoope.eu/big-data-action-value-context/data-business-asset/>, Jun. 17, 2019, retrieved from Internet Archive Wayback Machine <https://web.archive.org/web/20190617132412/https://www.i-scoop.eu/big-data-action=value-context/data/-business-asset/> on Aug. 16, 2021.
"Difference Blockchain and DLT," Marco Polo Network, Web page <https://www.marcopolonetwork.com/articles/distributed-ledger-technology/?redirect=true> Jan. 30, 2018, retrieved on Aug. 16, 2021.
"Discrete Choice Model and Analysis," Columbia Public Health, Web page <http://www.publichealth.columbia.edu/research/population-health-methods/discrete-choice-analysis>, Aug. 16, 2021, retrieved on Aug. 16, 2021.
"Distributed Ledger," Wikipedia, Web page <https://en.wikipedia.org/wiki/Distributed_ledger>, May 7, 2020, retrieved from Internet Archive Wayback Machine <https://web.archive.org/web/20200507030050/https://en.wikipedia.org/wiki/Distributed_ledger> on Aug. 16, 2021.
"Equilibrium", Economics Online, Web page <https://www.economicsonline.co.uk/Competitive_markets/Market_equilibrium.html>, Apr. 21, 2020, retrieved from Internet Archive Wayback Machine <https://web.archive.org/web/20200421082338/https:// www.economicsonline.co.uk/Competitive_markets/Market_quilibrium.html> on Aug. 16, 2021.
"Gabor Granger Pricing Technique," Web page <https://www.djsresearch.co.uk/glossary/item/Gabor-Granger-Pricing-Technique>, Apr. 3, 2018, retrieved from Internet Archive Wayback Machine <https://web.archive.org/web/20180403181954/http://www.djsresearch.co.uk/glossary/item/Gabor-Granger-Pricing-Technique> on Aug. 16, 2021.
"How does government regulation impact the drugs sector?" Investopedia, Web page <https://www.investopedia.com/ask/answers/032315/how-does-government-regulation-impact-drugs-sector.asp>, Dec. 17, 2019, retrieved from Internet Archive Wayback Machine <https://web.archive.org/web/20191217233557/https://www.investopedia.com/ask/answers/032315/how-does-government-regulation-impact-drugs-sector.asp> on Aug. 16, 2021.
Kenton, Will, "Regulated Market," Investopedia, Web page, <https://www/investopedia.com/terms/r/regulated-market.asp>, Nov. 8, 2019, retrieved from Internet Archive Wayback Machine <https://web.archive.org/web/20191108194547/https://www.investopedia.com/terms/r/regulated-market.asp> on Aug. 16, 2021.
Kenton, Will, "Walras's Law," Investopedia, Web page <https://www.investopedia.com/terms/w/walras-law.asp>, Apr. 19, 2019, retrieved from Internet Archive Wayback Machine <https://web.archive.org/web/20190421175422/https://www.investopedia.com/terms/w/walras-law.asp> on Aug. 16, 2021.
Laney, Doug, "Infonomics: The Economics of Information and Principles of Information Asset Management," The Fifth MIT Information Quality Industry Symposium, Web page <https://mitiq.mit.edu/QIS/Documents/CDOIQS_201177/Papers/05_01_7A-1_Laney.pdf> Jul. 13-15, 2011, retrieved on Aug. 16, 2021.
"Market Mechanics", MBA Skool, Web page <https://www.mbaskool.com.com/business-concepts/marketing-and-strategy-terms/11345-market-mechanics.html>, May 9, 2017, retrieved from Internet Archive Wayback Machine <https://web.archine.org/web/20170509144934/http://www.mbaskool.com/business-concepts/marketing-and-strategy-terms/11345-market-mechanics.html> on Aug. 16, 2021.
McGuire, John L., et al., Ullmann's Encyclopedia of Industrial Chemistry. doi:10.1002/14356007.a19_273.pub2. ISBN 978-3527306732.
"Nash Equilibrium", Wikipedia, Web page <https://en.wikipedia.org/wiki/Nash_equilibrium>, May 3, 2020, retrieved from Internet Archive Wayback Machine <https://web.archive.org/web/20200503020753/https://en.wilipedia.org/wili/Nash_equilibrium> on Aug. 16, 2021.
Pettey, Christy, "Treating Information as an Asset," Garter, Web page <https:www.garter.com/smarterwithgartner/treating-information-as-an-asset/>, Nov. 30, 2017, retrieved on Aug. 16, 2021.
"Pharmaceutical Industry," Wikipedia, Web page <https://en.wikipedia.org/wiki/Pharmaceutical_industry>, May 3, 2020, retrieved from Internet Archive Wayback Machine <https:////web.archive.org/web/20200503135340/https://en.wikipedia.org/wiki/Pharmaceutical_industry> on Aug. 16, 2021.
"The Anti-Kickback Statute Basics: Enforcement and Safe Harbors," Summit Health Law Partners, Web page <https://summithealthlawpartners.com/services/the-anti-kickback-statute> on Aug. 16, 2021, retrieved from Internet archive Wayback Machine <https://web.archive.org/web/20210816190640/https://summithealthlawpartners.com/services/the-anti-kickback-statute> on Aug. 16, 2021.
"What is a conjoint analysis? Conjoint types & when to use them," Qualtrics XM, Web page <https://www.qualtrics.com/experience-management/research/types-of-conjoint/>, Jan. 17, 2019, retrieved from internet Archive Wayback Machine <https://web.archive.org/web/20190117143608/https://www.qualtrics.com/experience-management/research.types-of-conjoint/> on Aug. 16, 2021.

* cited by examiner

| Description | Type | Update Frequency | Subscription Length | Expiration | Price |
|---|---|---|---|---|---|
| 10,000 EHRs from a hospital in Nebraska | Historical | N/A | N/A | 60 days | $150,000 |
| 1,000 prescriptions from a pharmacy in Virginia | Ongoing | Monthly | 3 months | 4 days | $300/month |
| 3,577 EHRs from a doctor's office in Oregon | Ongoing | Weekly | 6 months | 15 days | $215/month |

FIG. 6

SYSTEMS AND METHODS FOR DISTRIBUTED LEDGER-BASED DATA EXCHANGE

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCES TO RELATED APPLICATIONS

This application claims the benefit of U.S. patent application Ser. No. 17/302,806 filed on May 12, 2021 and entitled "System and Method for Distributed Ledger-Based Data Exchange," which is hereby incorporated by reference in its entirety. This application also claims the benefit of U.S. Provisional Patent Application No. 62/704,541 filed on May 14, 2020 and entitled "System and Method for a Compliant Healthcare Data Marketplace," which is hereby incorporated by reference in its entirety.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE DISCLOSURE

The present disclosure generally relates to distributed ledger technology, and more particularly to systems and methods for distributed ledger-based data exchange.

Many entities ("data providers") have large amounts of data siloed in their computer systems. Oftentimes, this data could be useful to other entities ("data consumers") who could use the data to improve the data consumers' operations. There are many barriers that prevent the data providers from sharing their siloed data with data consumers. Such barriers include lack of a decentralized way to track and record the exchange of data, data privacy concerns, data misuse concerns, and others technological and computer-centered disadvantages.

What is needed then are systems and methods for distributed ledger-based data exchange.

BRIEF SUMMARY

This Brief Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

One aspect of the disclosure is a non-transitory computer-readable storage medium. The storage medium may include executable instructions stored thereon. The executable instructions, when executed by a processor, may be configured to establish a connection, over a data network, to a node of a distributed ledger network that maintains a distributed ledger. The distributed ledger may include a cryptographically secure plurality of distributed leger records. The processor may be configured to obtain, over the data network, a first dataset from a first user. The processor may be configured to perform pre-processing on the first dataset to obtain a first data asset based on the first dataset. The processor may be configured to store the first data asset. The processor may be configured to calculate a first value for the first data asset. The processor may be configured to generate a first data proposition based on the first data asset. The first data proposition may include the first value for the first data asset or a description of the first data asset. The processor may be configured to obtain, over the data network, acceptance data from a second user. The acceptance data may include data indicating acceptance by the second user of the first data proposition. The processor may be configured to transmit, over the data network, a first distributed ledger record to the node of the distributed ledger network. The first distributed ledger record may include data based on the acceptance data.

As will be discussed in further detail herein, the systems and methods of the disclosure improve the functioning of computers and other technical fields. The systems and methods disclosed herein provide a way to record data exchanged between user devices in an encrypted, de-centralized, and immutable way. The distributed ledger network, along with its distributed ledger nodes, distributed ledger copies, or consensus mechanism allow parties to exchange data, and allow for records of that exchange to be permanently and immutably recorded. Furthermore, the systems and methods disclosed herein provide a way for users of a data exchange platform to exchange data anonymously, thus providing privacy and security. Lastly, the systems and methods disclosed herein provide for the training and application of artificial intelligence, machine learning, and other data analytics models regarding the data exchanged, allowing the systems and methods disclosed herein to calculate information regarding data exchanged on the data exchange platform faster and more accurately.

Numerous other objects, advantages and features of the present disclosure will be readily apparent to those of skill in the art upon a review of the following drawings and description of various embodiments.

BRIEF DESCRIPTION OF THE DRAWINGS

FIG. 6 is a table illustrating one embodiment of data propositions for distributed ledger-based data exchange.

DETAILED DESCRIPTION

Figure 1:
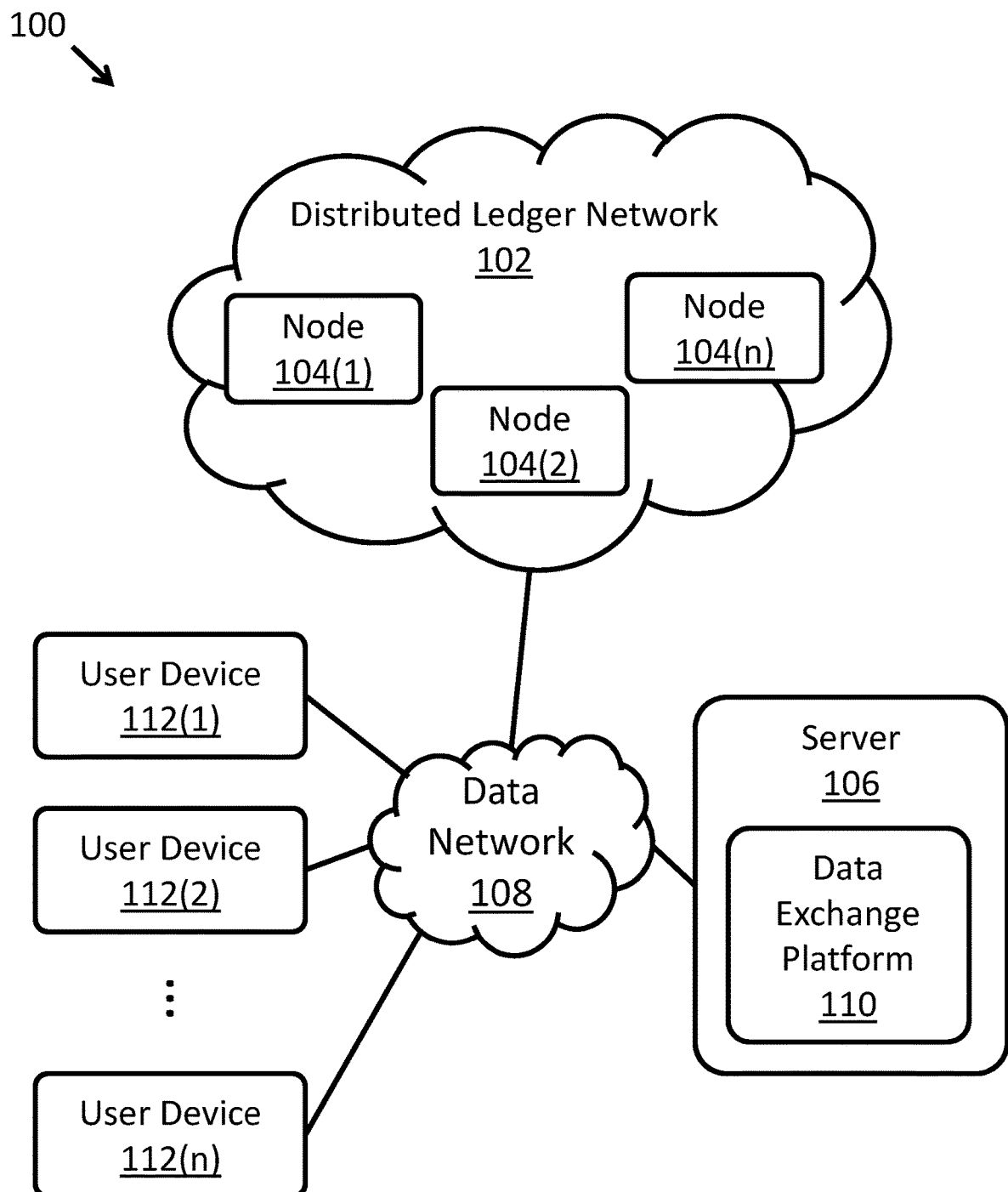
FIG. 1 is a schematic view illustrating one embodiment of a system for distributed ledger-based data exchange.

While the making and using of various embodiments of the present disclosure are discussed in detail below, it should be appreciated that the present disclosure provides many applicable inventive concepts that are embodied in a wide variety of specific contexts. The specific embodiments discussed herein are merely illustrative of specific ways to make and use the disclosure and do not delimit the scope of the disclosure. Those of ordinary skill in the art will recognize numerous equivalents to the specific apparatus and methods described herein. Such equivalents are considered to be within the scope of this disclosure and are covered by the claims.

The present disclosure is directed to systems and methods for distributed ledger-based data exchange. The systems and methods allow data providers to securely provide data to a data exchange platform, and allow data consumers to receive the provided data securely while complying with governmental regulations such as privacy regulations and anti-kickback regulations. The systems and methods allow the data exchange platform to utilize a distributed ledger to provide a secure and immutable record of events that occur on the platform.

As an example, a pharmaceutical company may wish to obtain data regarding prescription medications that it produces or that its competitors produce. Such data may include demographic data of people that use the prescription medication (e.g., the ages, sexes, or the geographic areas of people that use the medication), medical information of people that use the prescription medication (e.g., the medical histories of people that use the medication, whether positive medical outcomes follow patients' use the medication, etc.), or other data. Such data may inform the pharmaceutical company about developing future medications or may help the pharmaceutical company know to whom or where to target advertisements. However, it is difficult for the pharmaceutical company to obtain such desired data because of a variety of laws and regulations that prevent sharing of such data. These laws and regulations include privacy laws (such as the Health Insurance Portability and Accountability Act (HIPAA) in the United States) and anti-kickback statutes (such as the Anti-Kickback Statute Anti-Kickback Enforcement Act in the United States).

On the other side of the coin, healthcare systems store a trove of data related to patients and medications. Such data includes electronic health records (EHR), inventory management data (e.g., medications and healthcare equipment a hospital utilizes), data from smart cabinets (e.g., what medications are contained within the cabinet and how long they have been stored there), pharmacy data (e.g., what medications have been dispensed, what insurance providers are covering costs for the medication, the prices being charged for medications, etc.). This data is usually siloed in the healthcare system's computer system and is unable to be shared or utilized except for healthcare treatment purposes due to the same privacy and anti-kickback laws and regulations.

The healthcare system may send a dataset containing a portion of the healthcare system's EHRs to a data exchange platform. The data exchange platform may include data propositions, which may include offerings to grant access to datasets that have been provided to the data exchange platform. The data exchange platform may include users that provide data to the platform or that purchase access to data on the platform. The data exchange platform may maintain the users of the platform as anonymous to each other so that they do not know who is providing data to the platform and who is purchasing access to data on the platform. The platform may prevent users from communicating with each other over the platform. Such restrictions allow users to provide datasets and allow users to purchase access to data propositions without violating privacy and anti-kickback laws and regulations.

The data exchange platform may receive the healthcare system's dataset, pre-process the dataset to remove personal identifiers or to anonymize the data and then store the dataset in a data storage. The data exchange platform may then calculate a value for the dataset at which a user of the platform can purchase access to the data. For example, the data exchange platform may determine that the dataset from the healthcare system includes a value of $10,000. The data exchange platform may create a data proposition that includes the value of the dataset and a description of the dataset. The data exchange platform may allow users to view the data proposition so that the users can determine whether they want to purchase access rights to the dataset.

A pharmaceutical company user on the data exchange platform may view the data proposition. The pharmaceutical company does not know that the data proposition was provided by the hospital system. Additionally, the hospital system does not know that the pharmaceutical company is considering purchasing access to the dataset. The pharmaceutical company may decide that it will purchase access to the dataset, and may submit payment. The data exchange platform may then allow the pharmaceutical company user access to the dataset. The data exchange platform may record the data about the purchase on a distributed ledger, which may provide a decentralized, immutable record of the purchase. The pharmaceutical company may use the dataset to make decisions regarding future action by the company, such as what products to develop or where to focus advertising campaigns.

As used herein, a "data provider" may include an entity that provides data to the data exchange platform in order for the data exchange platform to generate a data proposition based on that provided data so that other entities may purchase access to the provided data. Examples of data providers may include a healthcare provider. A healthcare provider may include a hospital system, a hospital, a doctor's office, a pharmacy, or other healthcare provider entities. A data provider may include a social media platform, a seller of goods or services, or some other entity that may collect data.

As used herein, a "data consumer" may include an entity that consumes data offered by the data exchange platform. The data consumer may consume the data by purchasing access to the data from the data exchange platform. Examples of data providers may include a pharmaceutical company, a pharmaceutical manufacturer, a manufacturer of goods, a provider of goods or services, or some other entity that may use data.

As used herein, a "logical segment" of a data storage may include a portion of a logical structure that stores data. The logical segment may be logically separated from other logical segments. Examples of logical separation may include two logical segments being in separate files in a file system, in separate tables in a relational database, or other logical separation techniques. In some embodiments, two logical segments may physically reside on the same data storage device, while in other embodiments, two logical segments may be physically stored on separate data storage devices.

FIG. 1 depicts one embodiment of a system 100. The system 100 may include a system for distributed ledger-based data exchange. The system 100 may include a distributed ledger network 102. The distributed ledger network 102 may include one or more distributed ledger network nodes 104(1)-(n) (sometimes called "nodes"). The system 100 may include a server 106. One or more nodes 104(1)-(n) of the distributed ledger network 102 may be data communication with the server 106 over a data network 108, such as the Internet. The server 106 may host a data exchange platform 110. The data exchange platform 110 may allow users of the platform 110 to provide data to the platform 110 and may allow users of the platform 110 to purchase access rights to the data. The data exchange platform 110 may allow users to perform this functionality in an anonymous and secure manner such that the users comply with privacy and anti-kickback laws and regulations. The data exchange platform 110 may generate distributed ledger records based on user activity on the platform 110 and send the distributed ledger records to the distributed ledger network 102 to be added to the distributed ledger of the distributed ledger network 102 in a decentralized and immutable manner. In some embodiments, a distributed ledger record may be known as a "distributed ledger transaction."

Figure 2:
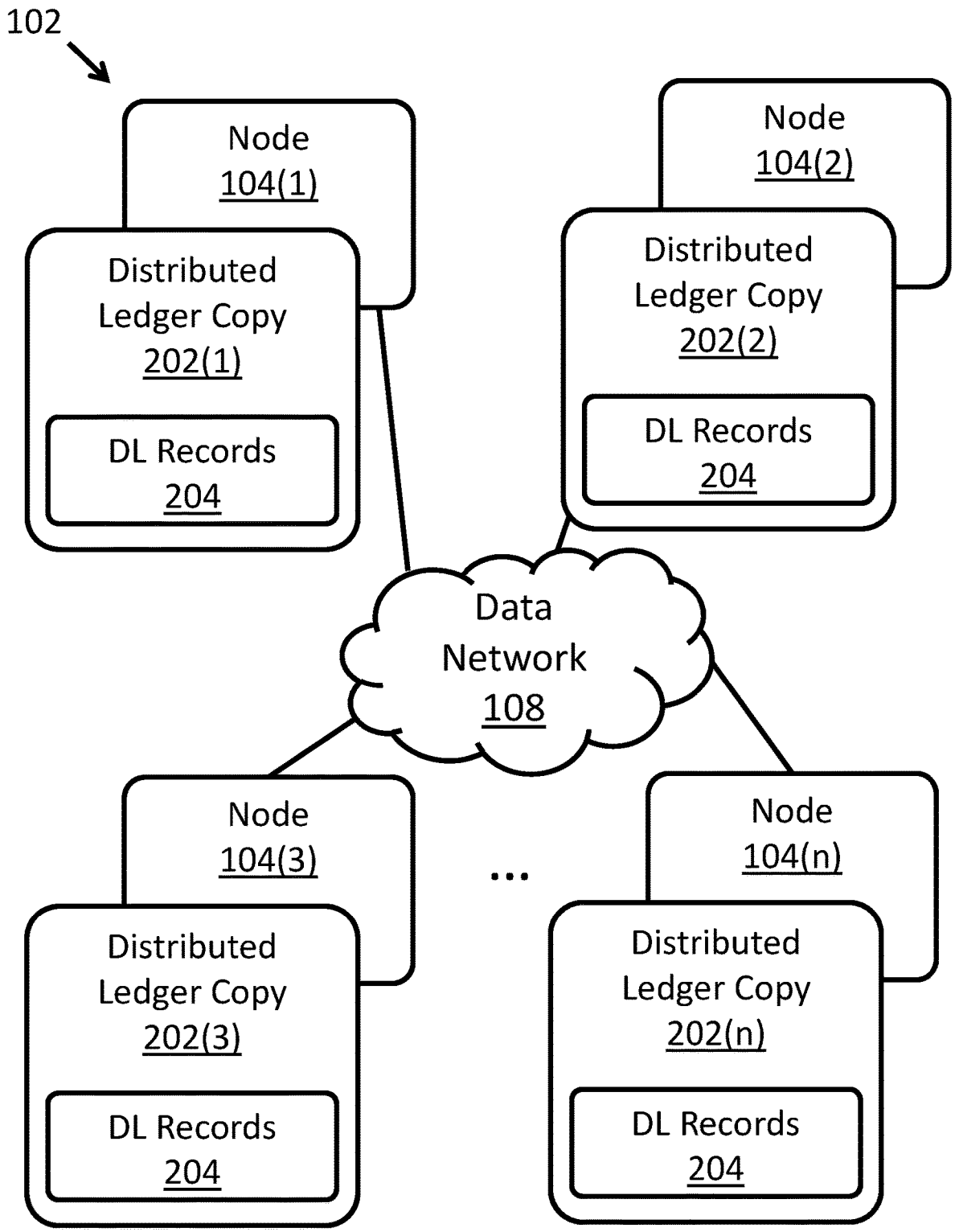
FIG. 2 is a schematic view illustrating one embodiment of a distributed ledger network for a system for distributed ledger-based data exchange.

FIG. 2 depicts one embodiment of a distributed ledger network 102. The distributed ledger network 102 may operate and maintain a distributed ledger. A distributed ledger may include a series of distributed ledger records that are stored in a decentralized manner and synchronized across copies of the distributed ledger. The distributed ledger network 102 may include one or more distributed ledger nodes 104(1)-(n). A node 104 may include a computing device that may execute software that perform distributed ledger functionality. The one or more nodes 104(1)-(n) may be in data communication with each other over the data network 108.

Each node 104 of the distributed ledger network 102 may include a distributed ledger copy 202. Each distributed ledger copy 202 may include one or more distributed ledger records 204. A distributed ledger record of the one or more distributed ledger records 204 may include data to be recorded on the distributed ledger. Specific types of data to be recorded will be discussed further below. A distributed ledger record may include a timestamp of when the distributed ledger record was generated.

In some embodiments, a node 104 may receive a distributed ledger record, validate the distributed ledger record, and send the distributed ledger record to other nodes 104 of the distributed ledger network 102. The nodes 104 may add received distributed ledger records to the distributed ledger records 204 of the distributed ledger according to a consensus mechanism. The consensus mechanism may determine which distributed ledger records are added to the distributed ledger records 204 and in what order. The consensus mechanism may synchronize the distributed ledger copies 202 such that all of the distributed ledger copies 202(1)-(n) have the same distributed ledger records 204 in the same order. In one embodiment, a distributed ledger record may include a timestamp of when the distributed ledger record was received by a node 104.

A distributed ledger copy 202 may include verification data that causes the distributed ledger copy 202's distributed ledger records 204 to be immutable once added to the distributed ledger copy 202. Such data may include one or more hashes or other verification data. If a node 104 were to modify a past distributed ledger record in the distributed ledger records 204 of that node's 104 distributed ledger copy 202, the verification data may not match other node's 104 distributed ledger copies' 202 verification data, which may indicate that that node 104 may not be trustworthy.

In some embodiments, the distributed ledger network 102 may be permissioned. The distributed ledger network 102 being permissioned may include the distributed ledger network 102 requiring permission to view the distributed ledger, add distributed ledger records to the distributed ledger, be a node 104 on the network 102, or otherwise interact with the network 102. In some embodiments, the data exchange platform 110 may grant permission to access to the distributed ledger network 102. In other embodiments, some other entity may grant the permission. The data exchange platform 110 may grant permission only to users of the platform 110 or only to certain users of the platform 110. The data exchange platform 110 granting permission may help ensure that the users of the distributed ledger network 102 are known to the platform 110, vetted by the platform 110, or otherwise have a certain level of trust with the platform 110.

In some embodiments, the distributed ledger copies 202(1)-(n) may be encrypted. Encrypting the distributed ledger copies 202(1)-(n) may prevent entities without the necessary cryptographic key(s) to view, access, or otherwise interact with the distributed ledger network 102. In one embodiment, only entities that have been granted permission to the distributed ledger network 102 may receive such cryptographic keys.

The server 106 of FIG. 1 may include a computing device. A computing device may include an application server, a database server, a desktop computer, a laptop computer, a tablet computer, a smartphone, a virtual machine, or some other computing device. The server 106 may include a computer-readable storage medium. The server 106 may include a processor. The processor may include a central processing unit (CPU), and graphics processing unit (GPU), a core of a CPU or GPU, or some other computing processor. The computer-readable storage medium may include executable instructions that, when executed by the processor, may execute and host a data exchange platform 110.

Figure 3:
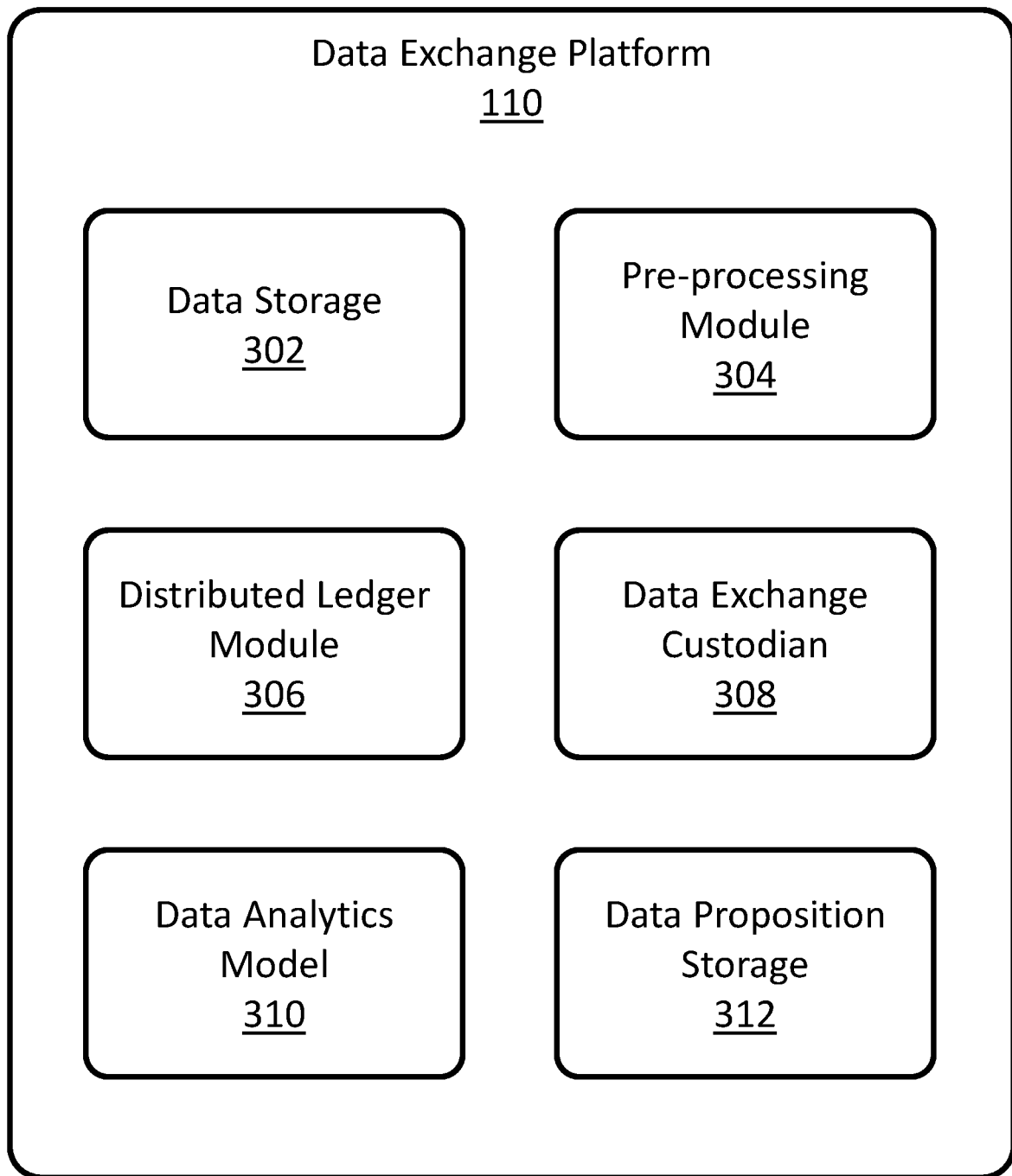
FIG. 3 is a schematic block diagram view illustrating one embodiment of a data exchange platform for distributed ledger-based data exchange.

FIG. 3 depicts one embodiment of the data exchange platform 110. The data exchange platform 110 may include a data storage 302. The data exchange platform 110 may include a pre-processing module 304. The data exchange platform 110 may include a distributed ledger module 306. The data exchange platform 110 may include a data exchange custodian 308. The data exchange platform 110 may include a data analytics model 310. The data exchange platform 110 may include a data proposition storage 312.

In some embodiments, the data exchange platform 110 may include the data storage 302. The data storage 302 may store a portion of data used by the data exchange platform 110 so that other components of the platform 110 can utilize the data. The data storage 302 may include a computer-readable storage medium. In one or more embodiments, the data storage 302 may include a logical storage type. The data storage 302 may include a file system, a database, cloud storage, or other logical storage types.

In one embodiment, the data exchange platform 110 may obtain a dataset from a first user device 112(1). The first user device 112(1) may include the user device 112 of a data provider user. The platform 110 may receive the dataset from the first user device 112(1) via the data network 108. The dataset may be encrypted such that a party without a certain cryptographic key cannot decrypt or read the dataset. For example, the dataset may have been encrypted with the public key of a public key infrastructure (PKI). The data exchange platform 110 may control the public key and the private key. The public key may be public so that other entities can encrypt data with the public key and send the encrypted data to the data exchange platform 110, and the platform 110 can decrypt the received data using the corresponding private key.

The data exchange platform 110 may decrypt the dataset received from the first user device 112(1) using the private key. The data exchange platform 110 may encrypt the dataset with a cryptographic key, which may be different than the public or private key of the platform's 110 PKI key pair. The data exchange platform 110 may encrypt the dataset so that if a malicious actor gain unauthorized access to the platform 110, the malicious actor may not be able to view the dataset. The data exchange platform 110 may store the dataset in the data storage 302.

Figure 4:
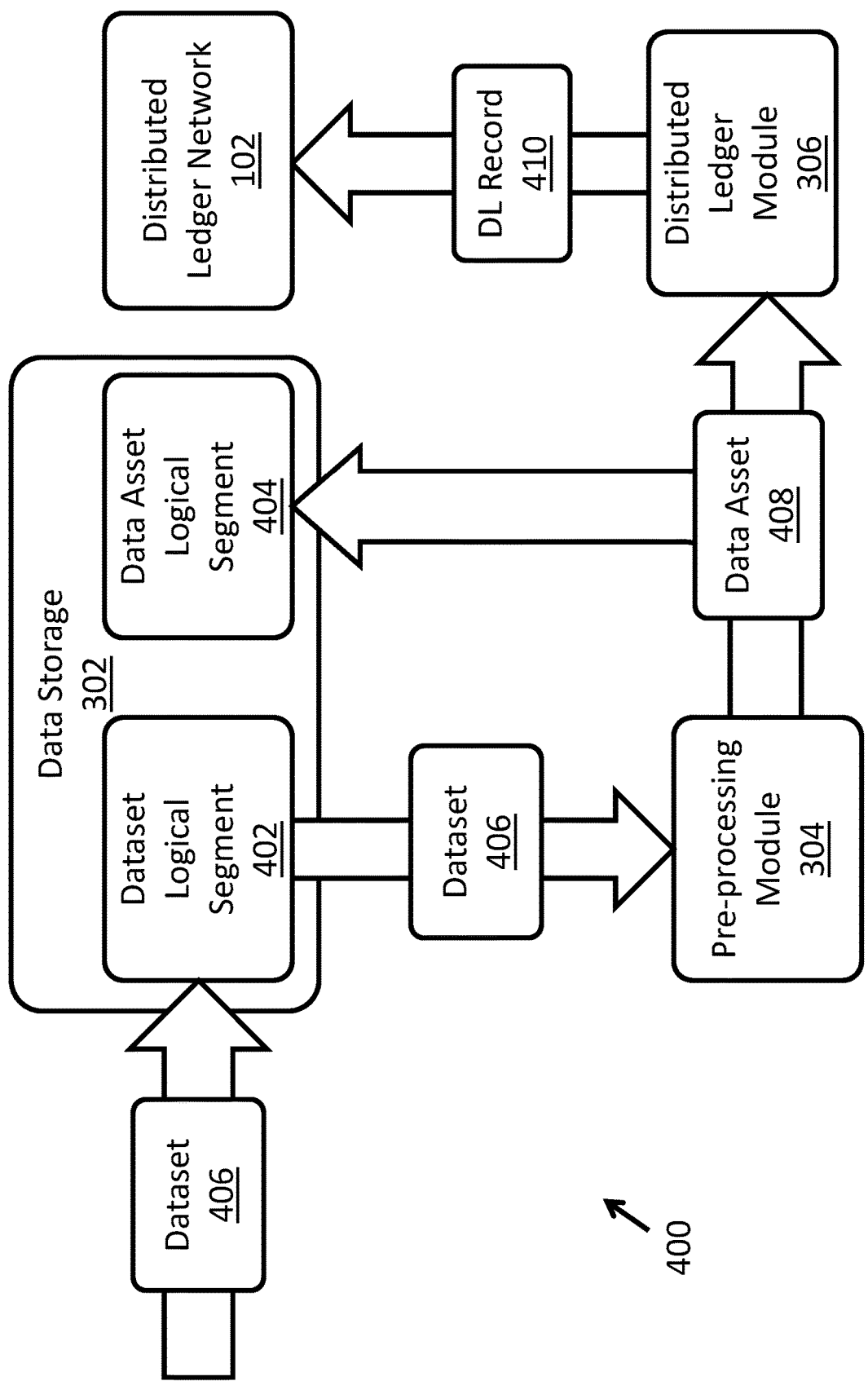
FIG. 4 is a data flow diagram illustrating one embodiment of a data flow for distributed ledger-based data exchange.

FIG. 4 depicts one embodiment of a dataflow 400. The dataflow 400 may include a flow of data associated with receiving the dataset from the data provider user device 112(1) and storing the data in the data storage 302. In some embodiments, the data storage 302 may include at least two logical segments: a dataset logical segment 402 and a data asset logical segment 404. The dataset logical segment 402 may include a portion of the data storage 302 configured to store data that the pre-processing module 304 has not yet pre-processed. The data asset logical segment 404 may include a portion of the data storage 302 configured to store data that the pre-processing module 304 has pre-processed. These two logical segments 402, 404 may be logically and/or physical separate such that a malicious actor that gains access to the data exchange platform 110 may not easily gain access to the dataset logical segment 402.

In some embodiments, the dataset logical segment 402 may receive a dataset 406. The dataset 406 may be from a data provider user device 112(1). The data storage device 302, the data exchange custodian 308, the data exchange platform 110, or some other component of the platform 110 may decrypt the dataset 406 using the public key and may re-encrypt the dataset 406 with another cryptographic key and store the dataset 406 in the dataset logical segment 402.

The dataset logical storage 406 may send the dataset 406 to the pre-processing module 304. In one embodiment, the pre-processing module 304 may perform pre-processing on the dataset 406. The pre-processing module 304 may de-identify data in the dataset 406. The pre-processing module 304 de-identifying the dataset 406 may include modifying the dataset 406. Modifying the dataset 406 may include removing personally identifying data from the dataset 406. Removing personally identifying data from the dataset 406 may include removing a name, address, government identification number, or other personally identifying data. Modifying the dataset 406 may include shifting a time in the first dataset 406 by a random amount. For example, if the dataset 406 includes a date and a time when a patient received medical care, the pre-processing module 304 may add or subtract a random amount of time from that date or time. In some embodiments, the pre-processing module 304 may shift the date or time such that the shifted date or time remains within the same day, week, month, or year as the original time and before the original reporting date. Modifying the dataset 406 may include aggregating a plurality of data records in the dataset 406. In some embodiments, the pre-processing module 304 may calculate one or more data record thresholds. A data record threshold may include a minimum number of data records needed for aggregation in order for compliant de-identification. The pre-processing module 304 may calculate a data record threshold based on analysis of the dataset 406.

In some embodiments, the pre-processing module 304 modifying the dataset 406 may include the pre-processing module 304 modifying the dataset 406 itself. The modified dataset 406, after the pre-processing is completed, may then be designated as a "data asset" 408. In one embodiment, the pre-processing module 304 modifying the dataset 406 may include the pre-processing module 304 copying at least a portion of the dataset 406 and modifying the copied portion. The modified portion of the data (and any original portion that was not modified but did not need to be de-identified) after the pre-processing is completed, may then be designated as a "data asset" 408. In some embodiments, the data exchange platform 110 may remove the original dataset 406 from the dataset logical segment 402. The data exchange platform 110 may perform this removal in order to not store personally identifying data. In some embodiments, the data storage 302 may store the data asset 408 in the data asset logical segment 404.

In some embodiments, a data asset 408 may include a historical data asset. A historical data asset may include a data asset 408 that will not be updated. The historical data asset may include a predetermined time covered by the data asset 408. For example, the data asset 408 may include multiple sales of pharmaceutical products, and the time covered by the data asset 408 may include the time between the earliest sale date and the last sale date in the data asset 408. In some embodiments, the predetermined time period may be included as data in the data asset 408. In other embodiments, the predetermined time period may be calculated (e.g., by the data exchange platform 110 using dates included in the data asset 408). In one embodiment, a data asset 408 may include an ongoing data asset. An ongoing data asset may include a data asset 408 that will be updated. The data provider of the data asset 408 may update the data asset 408 at a set frequency (e.g., every day, week, month, or other frequency) or may update the data asset 408 at no set frequency. The data asset 408 may include a start date, which may include an earliest date included in the data asset 408 or may include some other date.

In some embodiments, the data exchange platform 110 may include the distributed ledger module 306. The distributed ledger module 306 may assist the data exchange platform 110 with interacting with the distributed ledger network 102. In some embodiments, the distributed ledger module 306 may include a node 104 of the distributed ledger network 102. In one embodiment the distributed ledger module 306 may include a client program that interacts with the distributed ledger network 102.

In one embodiment, the distributed ledger module 306 may obtain a first hash based on a data asset 408. The data asset 408 may include a data asset 408 stored in the data asset logical segment 404. In some embodiments, the distributed ledger module 306 may calculate the hash of the data asset 408. In other embodiments, the pre-processing module 304, the data storage 302, or some other portion of the data exchange platform 110 may calculate the hash of the data asset 408. The distributed ledger module 306 may generate a distributed ledger record 410. The distributed ledger record 410 may include the hash. The distributed ledger module 306 may send the distributed ledger record 410 over the data network 108 to a node 104 of the distributed ledger network 102. The distributed ledger network 102 may add the distributed ledger record 410 to the distributed ledger records 204 according to the consensus mechanism of the network 102. In this manner, the hash of the data asset 408 may be immutably stored on the distributed ledger, and a party that gains access to the data asset 408 may verify that the data asset 408 has not been modified since being stored on the data exchange platform 110 using the hash stored on the distributed ledger of the distributed ledger network 102.

Figure 5:
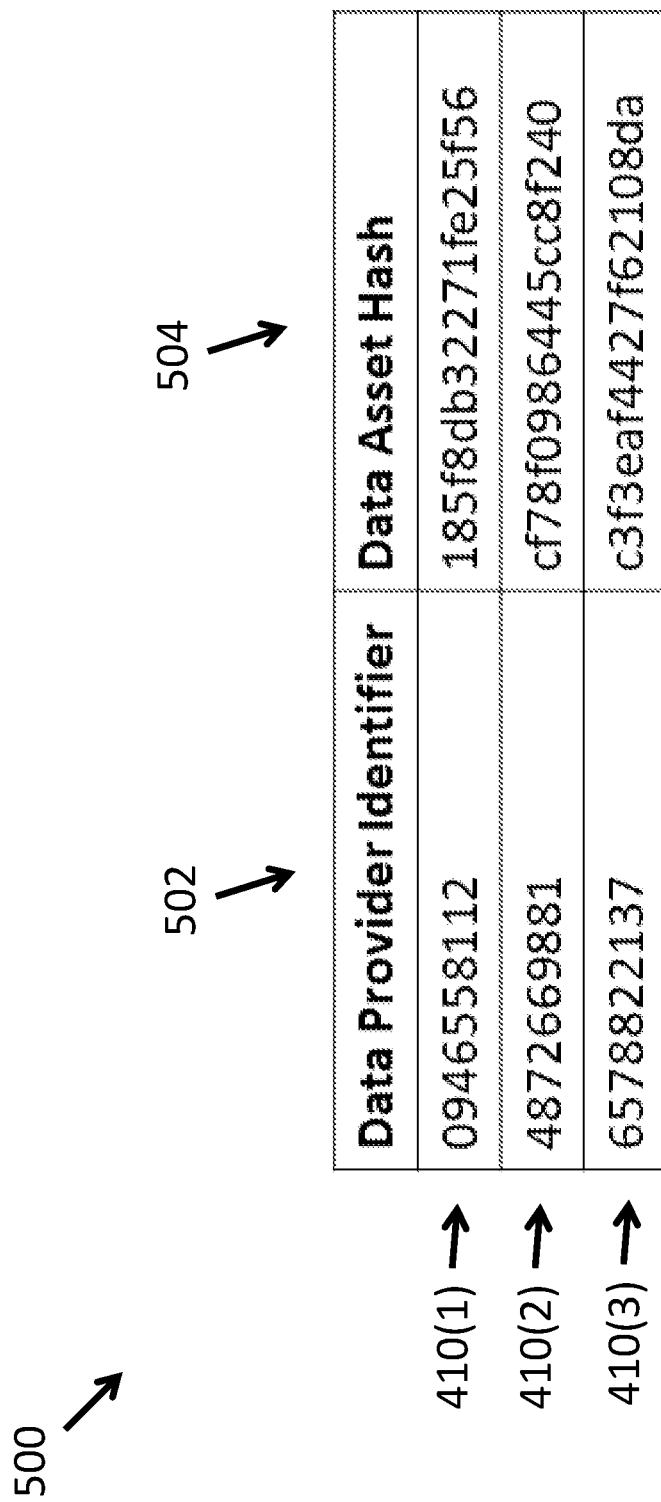
FIG. 5 is a table illustrating one embodiment of distributed ledger transactions for distributed ledger-based data exchange.

FIG. 5 depicts one embodiment of a portion 500 of the distributed ledger records 204 of the distributed ledger network 102. Each row in the portion 500 may represent a distributed ledger record 410. For example, the portion 500, as depicted in the example embodiment in FIG. 5, includes three distributed ledger records 410(1)-(3). Other embodiments may include fewer or more distributed ledger records 410. As can be seen from FIG. 5, a distributed ledger record 410 may include a data provider identifier 502. A data provider identifier 502 may include an identifier that may indicate the data provider user that provided the dataset 406 on which the data asset 408 may be based. The data provider identifier 502 may include a number, an alphanumeric text string, a globally unique identifier (GUID), or some other type of identifier. A distributed ledger record 410 may include a data asset hash 504. The data asset hash 504 may include the hash of the data asset 408.

In some embodiments, the data exchange platform 110 may include the data exchange custodian 308. The data exchange custodian 308 may include a module of the data exchange platform 110. The data exchange custodian 308 may coordinate the operation of different components of the data exchange platform 110. The data exchange custodian 308 may cause different components of the platform 110 to execute, exchange data between the components, or other functionality.

In one embodiment, the data exchange custodian 308 may obtain a value for a data asset 408. The value of the data asset 408 may include a price at which a data consumer user of the data exchange platform 110 may purchase access to the data asset 408. The data exchange custodian 308 may obtain the value for the data asset 408 in a variety of ways. In one embodiment, the data exchange custodian 308 may obtain a value from an entity. The entity may include the data provider that provided that dataset 406 the data asset 408 is based off of. The entity may include an expert at determining data asset 408 values that has examined the data asset 408. In some embodiments, the data exchange custodian 308 may obtain one or more values of similar data assets 408 stored by the data exchange platform 110 that have already been appraised and have received a value. The data exchange custodian 308 may calculate the value of the data asset 408 using a combination of these previously mentioned values. The data exchange custodian 308 may weight one or more of these previous values in calculating the data asset's 408 value.

In some embodiments, the data exchange custodian 308 may obtain a value for the data asset 408 from a data analytics model 310. The data analytics model 310 may include a machine learning model, an artificial intelligence (AI) model, a regression model, or some other type of model. The machine learning model may include an artificial neural network (ANN), which may include a deep learning network, a convolutional neural network (CNN), a radial basis function (RBF) network, a recurrent neural network (RNN), a long short-term memory (LSTM), or some other type of ANN. The data analytics model 310 may have been trained on a training dataset prior to the data analytics model 310 calculating the value for the data asset 408.

In one embodiment, the data exchange custodian 308 or the data analytics model 310 may construct a training dataset. The training dataset may include multiple training records. A training record may include data stored in or based on a data asset 408. The data asset 408 may include a data asset 408 stored in the data storage 302.

In some embodiments, the training record may include a number of beds associated with the data provider of the data asset 408. The training record may include a revenue metric of the data provider of the data asset 408. A revenue metric may include revenue earned during a certain time period such as during a certain month, year, or multi-year period. The revenue metric may cover a current time period, a recent time period (such as the most recently completed month, year, or multi-year period), or some other time period. In one embodiment, the training record may include data indicating whether a pharmaceutical product included in the data asset 408 treats symptoms related to a specialty of a healthcare worker employed by the data provider. For example, the training record may include data about a heart disease medication and that the data provider may employ a cardiologist.

In some embodiments, the training record may include a population metric. The population metric may include a measurement of the number of potential patients covered by the data provider's location. The population metric may include a measurement in total potential patients, potential patients per area (e.g., number of patients per square mile), or some other population measurement metric. The training record may include a diagnosis code metric. The diagnosis code metric may include data indicating whether a pharmaceutical product included in the data asset 408 can be applied to only a certain diagnosis code or whether the pharmaceutical product can be applied to multiple diagnosis codes. The diagnosis code metric may include a number of unique diagnosis codes. A higher number of diagnosis codes may indicate that the pharmaceutical product has a higher likelihood of off-label usage.

In one or more embodiments, a training record may include data source data. The data source data may include data regarding how the data asset 408, the dataset 406 from which the data asset 408 was derived, was or will be obtained from the data provider. Such data source data may include data indicating a data warehouse extract, file transfer protocol (FTP), a flat file, application programming interface (API) access, or some other type of data access.

A training record may include a cost of a pharmaceutical product included in the data asset 408. The cost may include the price at which the data provider of the data asset 408 purchased the product, sells the product, or some other price metric. In one embodiment, the training record may include classification data. The classification data may include data indicating a category of treatments associated with a pharmaceutical product included in the data asset 408. The training record may include a shelf life of a pharmaceutical product included in the data asset 408. The shelf life may include the amount of time the pharmaceutical product is available to be administered before reaching an expiration date.

In some embodiments, a training record may include a time period. The time period may include a time period covered by the data asset 408. For example, the time period for a data asset 408 may include a number of days, weeks, months, or years that is covered by the data in the data asset 408. In some, embodiments, the time period may include a duration of a subscription to the data asset 408. A training record may include an age of the data asset 408. The age of the data asset 408 may include the difference between a date included in the data asset 408 and another date. The date included in the data asset 408 may include a most recent transaction in the data asset 408. The other date may include the date the data asset 408 was created, the date the data asset 408 was appraised, the date the dataset 406 the data asset 408 is based on was received by the data exchange platform 110, or some other date. The age of the data asset 408 may be measured in minutes, hours, days, months, years, or some other time period. In some embodiments, a training record may include a data asset 408 type. The data asset 408 type may include data indicating whether the data asset 408 is a historical data asset 408 or an ongoing data asset 408.

In one embodiment, a training record may include data indicating the accuracy of the data asset 408. The accuracy may include a measurement of how accurately the data in the data asset 408 represents reality or a verifiable source. A training record may include data indicating the integrity of the data asset 408. The integrity may include a measurement of whether the data asset 408 includes appropriate links and relationships among data in the data asset 408. A training record may include data indicating the consistency of the data asset 408. The consistency may include a measurement of whether each type of data in the data asset 408 has a single representation. For example, the consistency may be high if all of the sales transactions are of the same form, and the consistency may be low if the sales transaction of the data asset 408 are in many different forms.

In one embodiment, a training record may include data indicating the completeness of the data asset 408. The completeness may include a measurement of whether there are missing fields, instances, records, transactions, or other data in the data asset 408. A training record may include data indicating the accessibility of the data asset 408. The accessibility may include a measurement of easily the data in the data asset 408 can be retrieved or integrated into a business process. A training record may include data indicating the precision of the data asset 408. The precision may include a measurement of whether the data asset's 408 data has been recorded with precision. A training record may include data indicating the timeliness of the data asset 408. The timeliness may include a measurement of whether the data provider updates the data asset 408 with sufficient frequency.

In one or more embodiments, a training record may include data indicating the relevance of the data asset 408. The relevance may include a measurement of whether the data asset 408 is applicable to one or more business processes, decisions, workflows, or other business aspects. A training record may include data indicating the usability of the data asset 408. The usability may include a measurement of how well an entity may be able to understand, utilize, or leverage the data asset 408. A training record may include data indicating the credibility of the data asset 408. The credibility may include a measurement of how credible the data asset 408 may be. A training record may include data indicating the clarity of the data asset 408. The clarity may include a measurement of whether the data asset 408 offers unique meaning or can be easily comprehended. A training record may include data indicating the objectivity of the data asset 408. The objectivity may include a measurement of whether the data asset 408 is unbiased, impartial, or not dependent on the judgement, evaluation, or interpretation of an entity. A data record may include data indicating the scarcity of the data asset 408. The scarcity may include a measurement of how difficult it may be to independently arrive at data of the data asset 408.

In the training record data described above, a measurement may include one or more forms. A measurement may include a binary value (e.g., 1 for credible or 0 for not credible), a value between 0 and 1 (e.g., a value closer to 1 may indicating credibility and a value closer to 0 indicating lack of credibility), a value between two numbers, a set of discrete values (e.g., "not credible," "not likely credible," "likely credible," or "very credible"), or some other measurement. The data analytics model 310 or the data exchange custodian 308 may process the data asset 408 to generate a training record. Processing the data may include converting text values to numeric values, normalizing values, or other processing techniques that may facilitate the data analytics model 310 utilizing the training record.

In some embodiments, a training record may include a current value for a corresponding data asset 408. The current value may include a current price at which a data consumer may purchase access to the data asset 408. In one embodiment, the training record may include a different value for the corresponding data asset 408. The data exchange custodian 308 may train a data analytics model 310 on the training dataset. Training the data analytics model 310 on the training dataset may include inputting the training records into the data analytics model 310 and adjusting the configuration of the data analytics model 310 in response to whether the data analytics model 310 calculated the value of the corresponding data asset 408. Adjusting the data analytics model 310 may include adjusting a weight of an edge of a neural network, adjusting the connectivity of the neural network, or other adjustment techniques.

In some embodiments, the data exchange custodian 308 may obtain the value for the data asset 408 from the data analytics model 310 by causing the data analytics model 310 to calculate the value, which may include the data analytics model 310 performing an inference calculation to obtain the value for the data asset 408. The data analytics model 310 may accept the data asset 408 as input and may calculate the value as a result of the inference calculation.

In some embodiments, the data exchange custodian 308 may generate a data proposition based on the data asset 408. A data proposition may include information about the data asset 408 the data proposition is based on. The data proposition may include an offering for access to the data asset 408. A data consumer may accept a data proposition, and, in response, gain access to the data asset 408 the data proposition is based on.

In some embodiments, the data proposition may include the value of the data asset 408. The value may include the value obtained by the data exchange custodian 308 (e.g., from an entity or as a result of a calculation of the data exchange custodian 308 or the data analytics model 310). In one embodiment, the data proposition may include information about the data asset 408. Information about the data asset 408 may include a description of the data asset 408 the data proposition is based on. The description may include text describing the data asset 408. The description may include a sample portion of the data asset 408. The description may allow a data consumer to gain more information about the data proposition so that the data consumer can make an informed decision on whether to purchase access to the data asset 408. Information about the data asset 408 may include a data proposition expiration date. The data proposition expiration date may include the date that the data proposition is no longer available to be accepted by a data consumer user of the data exchange platform 110. Information about the data asset 408 may include a subscription length. The subscription length may include an amount of time for which the corresponding data asset 408 is accessible by a consumer user who has purchased access to the data asset 408. The subscription length may include a day, a week, a month, multiple months, a year, or some other length of time. In some embodiments, a data proposition may not include a subscription length, which may indicate that a purchasing data consumer user may access the corresponding data asset 408 for an unlimited amount of time (or at least as long as the data asset 408 is present on the data exchange platform 110). In some embodiments, information about the data asset 408 may include whether the data proposition or the corresponding data asset 408 is an ongoing data proposition/data asset or a historical data proposition/data asset. Information about the data asset 408 may include the frequency at which the data asset 408 is updated, as may be the case for an ongoing data asset.

In one or more embodiments, a data proposition may include a data proposition identifier. The data proposition identifier may include an identifier that may uniquely identify the data proposition from other data propositions generated by the data exchange platform 110. The data proposition identifier may include a number, an alphanumeric text string, a GUID, or some other type of identifier. In one embodiment, the data proposition may include the hash of the associated data asset 408. The hash may include the data asset hash 504 based on the data asset 408, which may have been included in the distributed ledger record 410, as discussed above in relation to FIG. 4 and FIG. 5. In some embodiments, the data proposition identifier may include the hash 504.

In some embodiments, the data exchange platform 110 may store the data proposition in the data proposition storage 312. The data proposition storage 312 may include one or more data propositions that are being offered to data consumer users of the data exchange platform 110. In some embodiments, the data storage 302 may include the data proposition storage 312. The data proposition storage 302 may be a logical segment of the data storage 302.

FIG. 6 depicts one embodiment of a portion 600 of the data propositions stored in the data proposition storage 312. Each row in the portion 600 may represent a different data proposition. While FIG. 6 depicts an example embodiment of the portion 600 with three data propositions, the portion 600 may include fewer or more data propositions. Furthermore, data propositions include may include fewer or more components than are depicted in the example data propositions of FIG. 6. As shown in FIG. 6, a data proposition may include a description 602. A data proposition may include a type 604, which may include whether the data proposition is a historical data proposition or an ongoing proposition. A data proposition may include a update frequency 606, which may indicate a frequency at which the corresponding data asset 408 is updated. A data proposition may include a subscription length 608. A data proposition may include an expiration date 610. The expiration date 610 may be indicated by a date, a date and time, or a countdown until the data proposition expires and is no longer available for purchase. A data proposition may include a value or price 612. The value 612 may include the value of the data asset 408 as obtained by the data exchange custodian 308 as discussed herein.

In one or more embodiments, data regarding a data proposition may be stored in a distributed ledger record 410 that has been added to the distributed ledger records 204 of the distributed ledger network 102. The data regarding the data proposition may include the data proposition, a portion of the data proposition, or data based on the data proposition. Data based on the data proposition may include a hash of the data proposition or other data, i.e., a data proposition hash.

Figure 7:
FIG. 7 is a table illustrating another embodiment of distributed ledger transactions for distributed ledger-based data exchange.

FIG. 7 depicts one embodiment of a portion 700 of the distributed ledger records 204 of the distributed ledger network 102. Each row in the portion 700 may represent a distributed ledger record 410. For example, the portion 700, as depicted in the example embodiment in FIG. 7, includes three distributed ledger records 410(4)-(6). Other embodiments may include fewer or more distributed ledger records 410. As can be seen from FIG. 7, a distributed ledger record 410 may include data proposition identifier 702. A distributed ledger record 410 may include a data proposition hash 704. A distributed ledger record 410 may include a data asset hash 504 of the data asset 408 that corresponds to or is associated with the data proposition.

In some embodiments, a second user of the platform 110 may view one or more of the data propositions stored in the data proposition storage 312. The second user may include a data consumer user, which may include a user of a second user device 112(2). The data consumer user may use its user device 112(2) to access, over the data network 108, a webpage or a software application that may interact with the data exchange platform 110. The data exchange platform 110 may send, over the data network 108, one or more data propositions to the user device 112(2). In one embodiment, the one or more data propositions may include a list of data propositions that conform to a search criteria of the data consumer user that the user sent to the data exchange platform 110 (e.g., via a search webpage of the platform 110 or a search screen of a software application). In some embodiments, the data exchange platform 110 may select the one or more data propositions based on information about the data consumer user, a purchase history of the data consumer user, or other information. In one embodiment, the data consumer user may interact with the webpage or software application to send, over the data network 108, acceptance data to the data exchange platform 110. The acceptance data may include data indicating acceptance by the data consumer user of a data proposition. The acceptance data may indicate that the data consumer user wishes to purchase access to the data asset 408 corresponding to the data proposition. The acceptance data may include the data proposition identifier 702 of the accepted data proposition, the data asset hash 504 of the data asset 408 associated with the accepted data proposition, or other data.

In some embodiments, multiple data consumer users of the data exchange platform 110 may accept the same data proposition, and thus, gain access to the same data asset 408. In one embodiment, acceptance of a data proposition may be limited. For example, only a specific number of data consumer users may accept a certain data proposition. In response to that number of data consumer users accepting, the data proposition may no longer be available to other data consumer users. In some embodiments, the data exchange platform 110 may make a certain data proposition only available to specific data consumer users for acceptance. That set of data consumer users may be determined by the data exchange platform 110.

The data exchange platform 110 may obtain, over the data network 108, the acceptance data from the second user. In some embodiments, in response to receiving the acceptance data, the data exchange platform 110 may transmit, over the data network 108, a distributed ledger record 410. The data exchange platform 110 may transmit the distributed ledger record 410 to a node 104(1) of the distributed ledger network 102. The distributed ledger record 410 may include data based on the acceptance data. The distributed ledger record 410 may include data indicating that the data consumer user purchased access to the data asset 408 corresponding to the data proposition that the data consumer user accepted.

Figure 8:
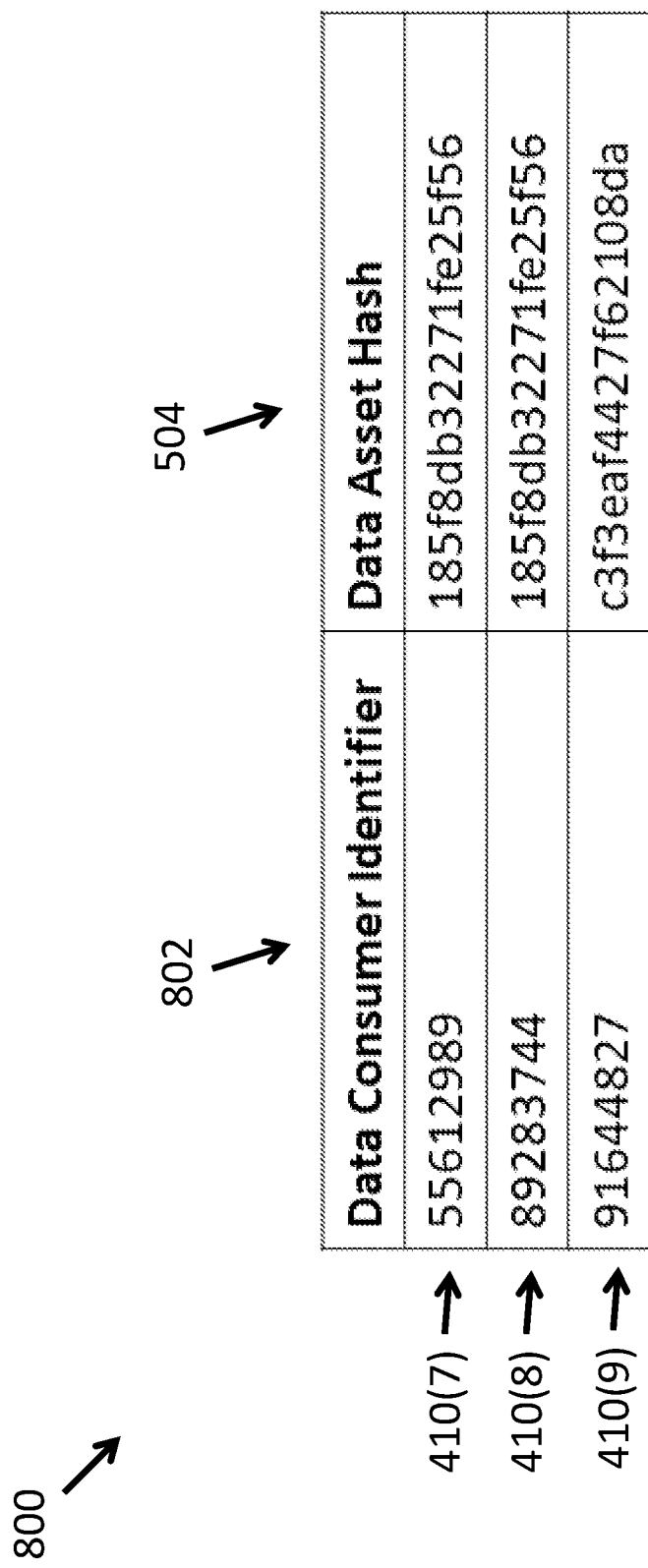
FIG. 8 is a table illustrating another embodiment of distributed ledger transactions for distributed ledger-based data exchange.

FIG. 8 depicts one embodiment of a portion 800 of the distributed ledger records 204 of the distributed ledger network 102. Each row in the portion 800 may represent a distributed ledger record 410. For example, the portion 800, as depicted in the example embodiment in FIG. 8, includes three distributed ledger records 410(7)-(9). Other embodiments may include fewer or more distributed ledger records 410. As can be seen from FIG. 8, a distributed ledger record 410 may include a data consumer identifier 802. A distributed ledger record 410 may include a data asset hash 504. The data consumer identifier 802 may include an identifier that may indicate the data consumer user that accepted a data proposition associated a data asset 408. The data asset hash 504 may include the hash of the associated data asset 408. The data consumer identifier 802 may include a number, an alphanumeric text string, a GUID, or some other type of identifier.

In some embodiments, one or more users of the data exchange platform 110 may have permission to view a distributed ledger copy 202 of the distributed ledger network 102. These users may include data provider users or data consumer users. As such, these users may view the distributed ledger records 204 and, thus, the distributed ledger records 410(1)-(9). However, in some embodiments, in order for the data exchange platform 110 and its users to comply with the privacy and anti-kickback laws and regulations, it may be necessary for a data provider user to not know who it is potentially providing data assets 408 to. Similarly, it may be necessary for a data consumer user to not know who it is potentially receiving data assets 408 from. As such, the distributed ledger network 102 and the data exchange platform 110 may maintain the data provider identifiers 502 or the data consumer identifiers 802 such that the users remain unknown from each other. In one embodiment, this may include each data provider identifier 502 and data consumer identifier 802 being unique, the data exchange platform 110 may store a mapping of each data provider identifier 502 and data consumer identifier 802 user to its respective user, and the data exchange platform 110 preventing users from accessing the mapping.

As an example, a hospital system may provide two datasets 406 to the data exchange platform 110, and the data exchange platform 110 may generate a distributed ledger record 410 for each dataset 406. The two distributed ledger records 410 may include the distributed ledger records 410(1)-(2) of FIG. 5. As can be seen from FIG. 5, even though the same data provider user may have provided the two datasets 406, the distributed ledger records 410(1)-(2) use different data provider identifiers 502 such that another user cannot determine that the same user provided both datasets 406. However, the data exchange platform 110 may store data mapping the data provider identifiers 502 of the distributed ledger records 410(1)-(2) to the hospital system user. In some embodiments, that hospital system may not be able to determine, from the data on the distributed ledger copies 202(1)-(n), that it provided those two datasets 406 since it may not have access to the data asset 408 in order to obtain the data asset hashes 504.

Similarly, in another example, a pharmaceutical company may gain access to two different data assets 408, and the data exchange platform 110 may generate a distributed ledger record 410 for each data asset 408 purchased by that company. The two distributed ledger records 410 may include the distributed ledger records 410(8)-(9) of FIG. 8. As can be seen from FIG. 8, even though the same data consumer user may have gained access to the two data assets 408, the distributed ledger records 410(8)-(9) use different data consumer identifiers 802 such that another user cannot determine that the same user purchased both data assets 408. However, the data exchange platform 110 may store data mapping the data consumer identifiers 802 of the distributed ledger records 410(8)-(9) to the pharmaceutical company user. In some embodiments, that pharmaceutical company may not be able to determine, from the data on the distributed ledger copies 202(1)-(n), that it purchased those two data assets 408.

In some embodiments, the data exchange platform 110 may permit a third type of user to view the one or more distributed ledger records 410 of the distributed ledger records 204 of the distributed ledger network 102. The third type of user may include a user of the data exchange platform 110 that may not be a data provider user or a data consumer user. In some embodiments, this third type of user may include a governmental regulatory body. The governmental body may include an agency tasked with enforcing healthcare privacy and anti-kickback laws. The governmental body may include the U.S. Department of Justice, the U.S. Food and Drug Administration, or some other governmental regulatory body.

In one embodiment, in response to the data consumer user accepting a data proposition, the data consumer user may gain access to the data asset 408 corresponding to the data proposition. This may include the data exchange platform 110 making the data asset 408 available to the data consumer user. The data asset 408 being available to the data consumer user may include the data consumer user being able to download the data of the data asset 408 to the second user device 112(2). Downloading the data of the data asset 408 may include downloading a file, to the second user device 112(2), that includes the data of the data asset 408. The file may include a MICROSOFT EXCEL file, a comma-separated values (CSV) file, a database file, a text file, or some other file format.

In one embodiment, the data exchange platform 110 may obtain a hash of the data asset 408 that a data consumer user has access to or is otherwise available to the data consumer user. For example, the data exchange platform 110 may execute a hash function on the data asset 408. The data exchange platform 110 may obtain the hash 504 of the same data asset 408 from the distributed ledger network 102 (e.g., as stored in a distributed ledger record 410 of the distributed ledger records 204 as shown in FIG. 5 or FIG. 7). The data exchange platform 110 may then verify that the first hash matches the second hash. The two hashes matching may indicate that the data asset 408 has not been modified since the platform 110 first stored the data asset 408 in the data storage 302. In some embodiments, the data consumer user may obtain the hashes and perform the hash comparison in order to independently verify that the data asset 408 it purchased has not changed.

In some embodiments, an entity that purchases access to data assets 408 on the data exchange platform 110 may include multiple data consumer users on the platform 110. For example, a pharmaceutical company many include a junior data analyst that is a user on the data exchange platform 110 and a senior data analyst that is also a user on the platform 110. These two users may be configured such that the junior data analyst user can view data propositions on the data exchange platform 110 and select a data proposition for purchase, but the purchase must be approved by the senior data analyst user prior to either user gaining access to the data asset 408 corresponding to the accepted data proposition. In one embodiment, in response to the data exchange platform 110 obtaining the acceptance data from a user (e.g., the junior data analyst user), the data exchange platform 110 may send a notification to another user (e.g., the senior data analyst user) In response to the data exchange platform 110 obtaining approval data from the other user (e.g., the senior data analyst user), the data exchange platform 110 may allow access to the data asset 408 corresponding to the data proposition indicated in the acceptance data. The data exchange platform 110 may transmit the distributed ledger record 410 to the node 104 of the distributed ledger network 102, and the distributed ledger record 410 may record the purchase of the data asset 408 as has been described above.

In one embodiment, the data exchange custodian 308 obtaining the value 612 for a data asset 408 may include the data exchange custodian 308 determining an initial value as the value 612. The data exchange custodian 308 determining the initial value may include the data exchange custodian 308 obtaining the initial value from an entity. The data exchange custodian 308 determining the initial value may include the data exchange custodian 308 obtaining the initial value from a value-determination algorithm.

In some embodiments, the data exchange custodian 308 obtaining the initial value may occur instead of the data analytics model 310 calculating the value 612 of the data asset 408. This may occur because the data analytics model 310 may not be ready to calculate the value 612. The data analytics model 310 may not be ready because there may not be sufficient training data in order to train the model 310.

In some embodiments, obtaining the initial value from an entity may include obtaining a suggested value from the data provider user that provided the dataset 406 that the data asset 408 is based on. Obtaining the initial value from an entity may include consulting with a data appraisal expert and obtaining a value 612 from that expert. In some embodiments, obtaining the initial value from a value-determination algorithm may include (1) selecting another data asset 408 that is similar to the data asset 408 whose value 612 is being determined (e.g., based on a proximity search, a nearest-neighbor search, or other type of determination), (2) determining a difference between the two data assets 408, and (3) adjusting the value 612 of the selected data asset 408 based on the difference to obtain the initial value. This may be known as "value-based pricing." In some embodiments, obtaining the initial value from a value-determination algorithm may include (1) selecting another data asset 408 that is similar to the data asset 408 whose value 612 is being determined (e.g., based on a proximity search, a nearest-neighbor search, or other type of determination) and using the value 612 of the selected data asset 408 as the initial value. This may be known as "competitor-based pricing" or "market-based pricing."

In one embodiment, the data exchange custodian 308 may include the initial value as the value 612 of the associated data proposition. The data exchange custodian 308 may make the data proposition available for viewing and purchase by data consumer users. The data proposition may include that initial value as long as the data proposition has not expired (e.g., before the arrival of the expiration date 610 of the data proposition).

In some embodiments, in response to a predetermined amount of time elapsing since calculating the value 612 of the data proposition (which may include the initial value), the data exchange custodian 308 may calculate a second value 612 for the data asset 408 associated with the data proposition. The data exchange custodian 308 may adjust the value 612 based on a number of users with a subscription to the data asset 408. In one embodiment, the predetermined amount of time elapsing may include the data proposition expiring due to reaching the expiration date 610. In one embodiment, the data exchange custodian 308 may increase the value 612 of the data asset 408 in response to the data asset 408 having a large number of data consumer users subscribed to that data asset 408. For example, in response to the number of data consumer users subscribed to the data asset 408 being above a certain threshold number of users, the data exchange custodian 308 may increase the value 612. In certain embodiments, the data exchange custodian 308 may decrease the value 612 of the data asset 408 in response to the data asset 408 having a small number of data consumer users subscribed to the data asset 408. For example, in response to the number of data consumer users that have subscribed to the data asset 408 being below a certain threshold number of users, the data exchange custodian 308 may decrease the value 612. In some embodiments, in response to the data exchange custodian 308 calculating the adjusted value 612 of the data asset 408, the data exchange custodian 308 may generate a new data proposition based on the data asset 408, and the new data proposition may include the adjusted price. The new data proposition may include a new expiration date 610. In some embodiments, the data exchange custodian 308 calculating the adjusted value 612 of the data asset 408 may include the data analytics model 310 calculating the value 612, as discussed above.

By performing the above functionality of calculating an initial value for a data asset 408 and re-calculating the value 612 of the data asset 408 after the pre-determined amount of time elapsing based on a number of data consumer users that have subscribed to the data asset 408, the data exchange custodian 308 may be able to iteratively determine an acceptable value 612 for the data asset 408. In response to one or more iterations of adjusting the value 612 of the data asset 408, the value 612 of the data asset 408 may reach an equilibrium, which may indicate an equilibrium of supply and demand.

In some embodiments, a data proposition may expire (e.g., in response to reaching the expiration date 610 of the data proposition) while one or more data consumer users may have an active subscription to the data asset 408 of the data proposition. An active subscription may include that the data consumer user's subscription to the data asset 408 has not run the entire subscription length 608. In response to the expiration of the data proposition and the data exchange custodian 308 calculating a new value 612 for the data asset 408 of the data proposition, the one or more users with the active subscription may continue to pay the previous value 612 for the data asset 408 while any newly subscribing data consumers users may pay the new value 612.

Figure 9:
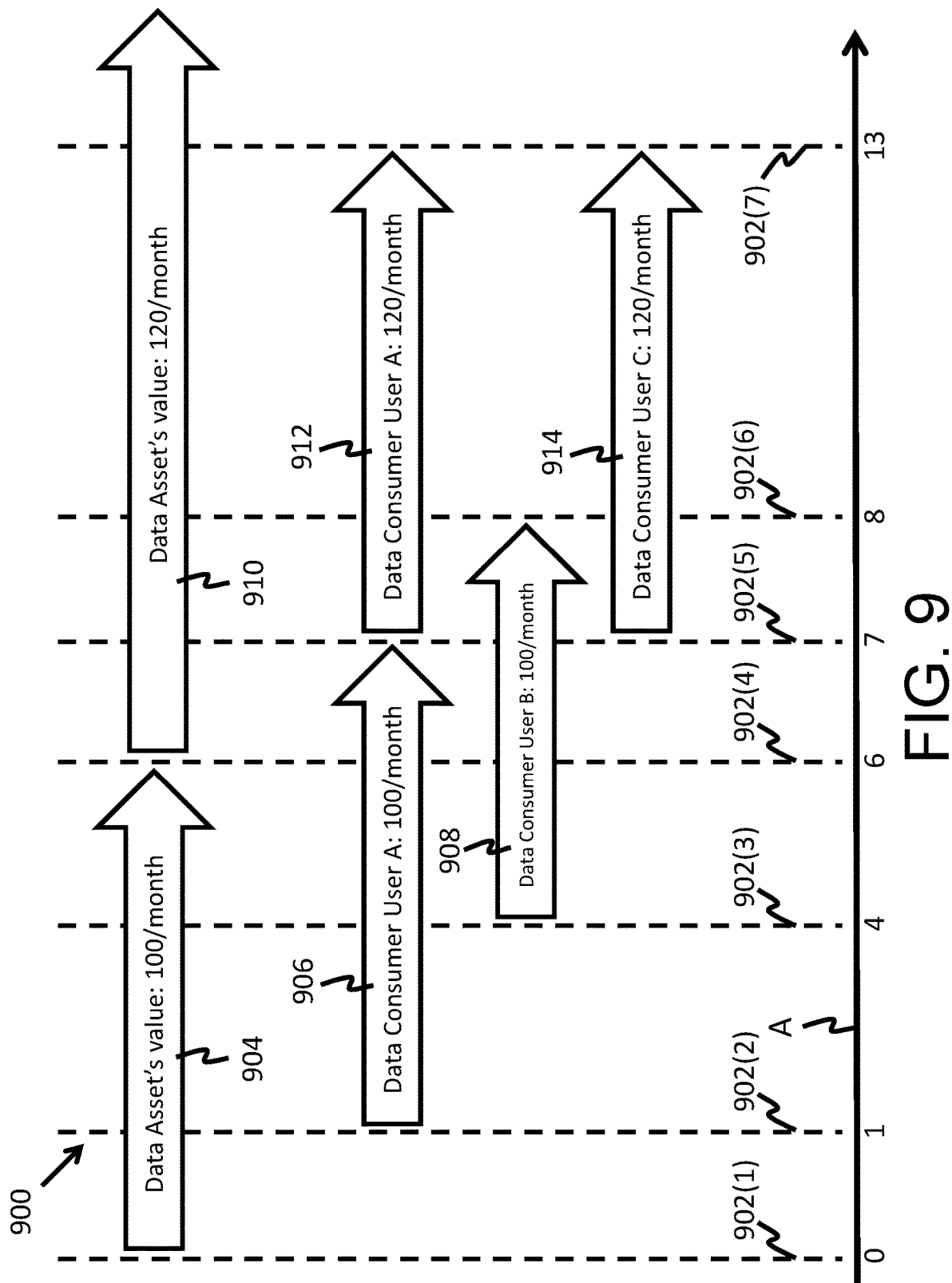
FIG. 9 is a timeline illustrating one embodiment of data propositions for FIG. 7 is a table illustrating another embodiment of distributed ledger transactions for distributed ledger-based data exchange.

FIG. 9 depicts an example embodiment of a timeline 900 depicting data consumer users purchasing access to a data asset 408 at different times and when the data asset 408 has different values 612. As depicted in the timeline 900, time may flow from left to right as depicted by arrow A. At an initial time (t=0) 902(1), the data exchange custodian 308 may calculate an initial value of 100 per month for a data asset 408. The data exchange custodian 308 may generate a data proposition for the data asset 408 with the value 612 as 100 per month and an expiration date 610 of 6 months, as represented by the arrow 904. At t=1 month (as represented by the line 902(2)), Data Consumer User A may subscribe to the data proposition. As represented by arrow 906, Consumer User A's subscription may include a cost of 100 per month (due to the value 612 of the data asset 408) and a subscription length 608 of 6 months. At t=4 months (as represented by the line 902(3)), Data Consumer User B may also subscribe to the data proposition represented by arrow 904. As represented by the arrow 908, Consumer User B's subscription may include a cost of 100 per month and a subscription length 608 of 4 months.

Continuing the example of FIG. 9, at t=6 months (as represented by the line 902(4)), the data proposition represented by arrow 904 may expire in response to the expiration date 610 of 6 months arriving. The data exchange custodian 308 may generate a new data proposition (or renew the data proposition) for the data asset 408, as represented by the arrow 910. The data proposition may include an expiration date 610 of 12 months from t=6 months 902(4). The data exchange custodian 308 may obtain a new value 612 for the data proposition of 120 per month. This increased value 612 may be in response to demand for the data asset 408 (which may be evidenced by Data Consumer User A's, Data Consumer User B's, and other data consumer users subscriptions to the data asset 408). The data exchange custodian 308 may make the data proposition available for viewing and so that data consumer users can subscribe to it. However, as can be seen from FIG. 9, Data Consumer User A and Data Consumer User B will still continue to pay 100 per month until their subscriptions expire.

Continuing the example of FIG. 9, at t=7 months (represented by the line 902(5)), Data Consumer User A's subscription to the data asset 408 may expire. As represented by the arrow 912, Data Consumer User A may choose to renew its subscription to the data asset 408 for a subscription length 608 of an additional 6 months. Data Consumer User A may pay the new value 612 of the data asset 408 of 120 per month. Also, at t=7 months, the Data Consumer User C may subscribe to the data asset 408 for the first time, as represented by the arrow 914. Data Consumer User C's subscription may include a cost of 120 per month (as indicated by the new value 612 of the data asset 408) and a subscription length 608 of 6 months.

At t=8 months (represented by the line 902(6)), Data Consumer User B's subscription may expire. Data Consumer User B may select not to renew its subscription to the data asset 408. At t=13 months (represented by the line 902(7)), the subscriptions of Data Consumer User A and Data Consumer User C expire. If either of these data consumer users decide to renew their subscriptions to the data asset 408, the cost may include the data asset 408's current value 612 of 120 per month.

It should be noted that, in some embodiments, one or more portions of the data exchange platform 110 may be executed or stored on a computing device external from the server 106. The external computing device may be in data communication with the server 106, for example, over the data network 108. For example, as described above, the dataset logical segment 402 of the data storage 302 may be located on an external computing device for security purposes. In some embodiments, the data analytics model 310 may be stored and executed on an external computing device. For example, the data analytics model 310 may include an ANN that executes in a distributed computing environment external from the server 106. Other components or functionality of the data exchange platform 110 may be located or performed on one or more external computing devices.

Figure 10A:
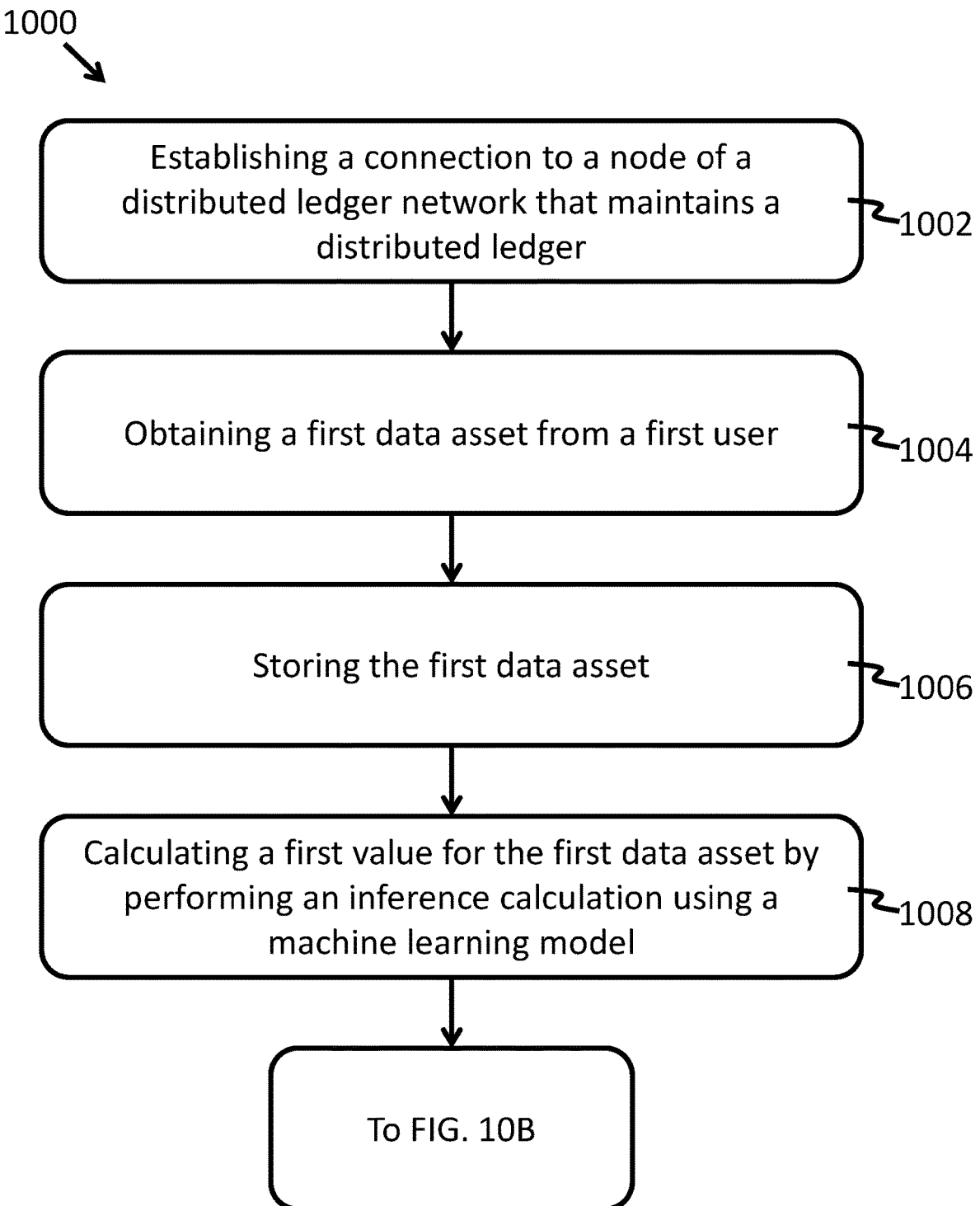
FIG. 10A is a flowchart illustrating one embodiment of a method for distributed ledger-based data exchange.
Figure 10B:
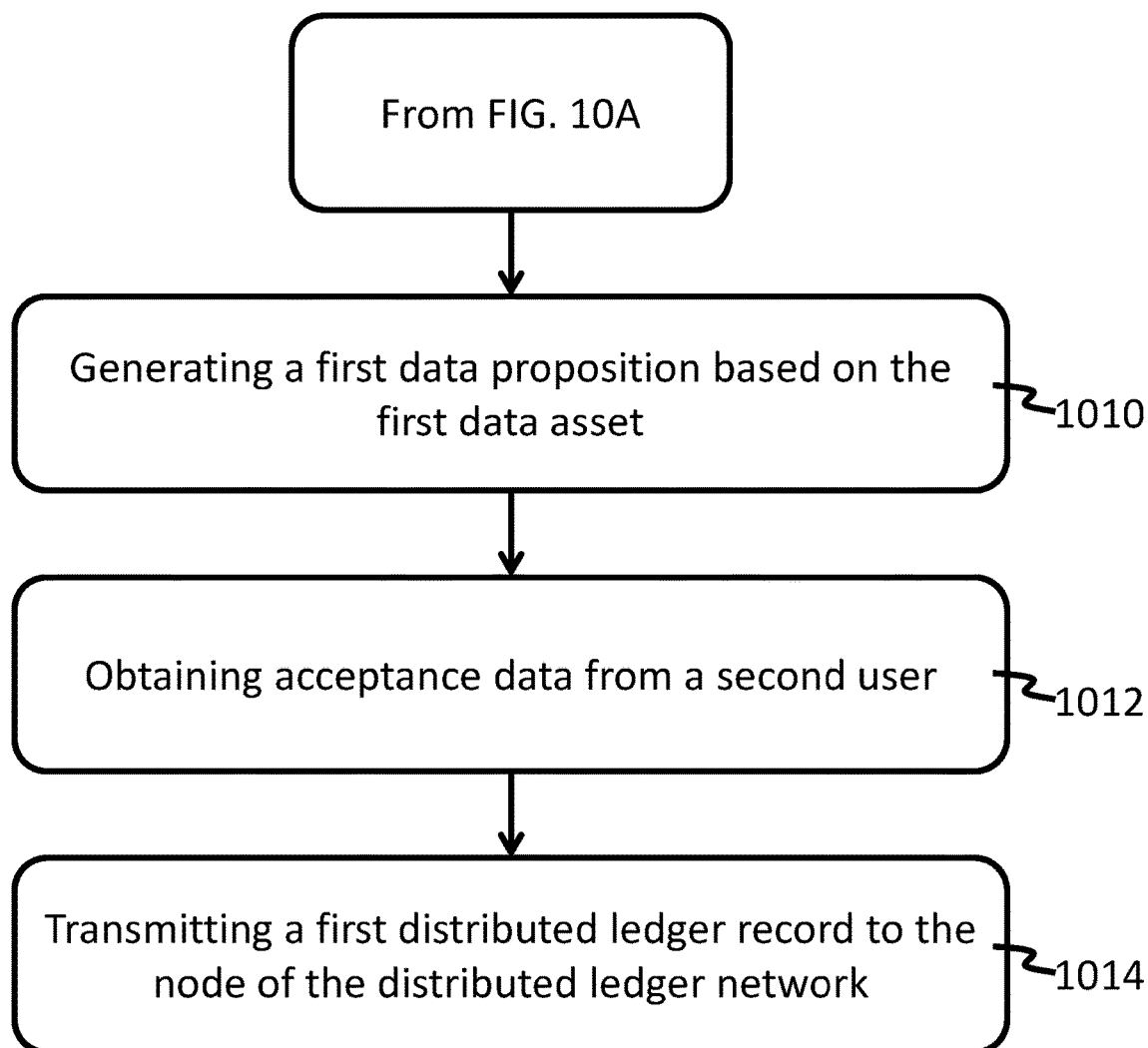
FIG. 10B is a flowchart illustrating the continuation of the method for distributed ledger-based data exchange of FIG. 10A.

FIG. 10 depicts one embodiment of a method 1000. The method 1000 may include a computer-implemented method. The method 1000 may include a method for distributed ledger-based data exchange. In one embodiment, the method may include establishing 1002 a connection, over a data network, to a node of a distributed ledger network that maintains a distributed ledger. The data network may include the data network 108, the node may include a node 104, the distributed ledger network may include the distributed ledger network 102. In some embodiments, the distributed ledger may include a cryptographically secure plurality of records. The records may include the distributed ledger records 204.

The method 1000 may include obtaining 1004, over the data network, a first data asset from a first user. The first data asset may include a dataset 406. The first data asset may include a data asset 408. The method 1000 may include storing 1006 the first data asset. Storing the first data asset may include storing the first data asset in the data asset logical segment 402 or the data asset logical segment 404, the pre-processing module 304 pre-processing the data asset (e.g., to de-identify data in the data asset), or other functionality discussed above. In some embodiments, the method 1000 may include calculating 1008 a first value for the first data asset. The first value may include a value 612. The calculating 1008 may include performing an inference calculation using a machine learning model. The machine learning model may include a data analytics model 310, as discussed above.

In some embodiments, the method 1000 may include generating 1010 a first data proposition. The first data proposition may be based on the first data asset. The first data proposition may include the first value for the first data asset. The first data proposition may include a description of the first data asset. The first data proposition may include a data proposition as discussed above in relation to FIG. 6.

In one embodiment, the method 1000 may include obtaining 1012, over the data network, acceptance data from a second user. The acceptance data may include data indicating acceptance by the second user of the first data proposition. The acceptance data may be similar to the acceptance data discussed above. The method 1000 may include transmitting 1014, over the data network, a first distributed ledger record to the node of the distributed ledger network. The first distributed ledger record may include data based on the acceptance data. The first distributed ledger record may include a distributed ledger record 410 similar to those discussed above in relation to FIG. 8.

In some embodiments, one or more components of the system 100 or the data exchange platform 110 may perform one or more of the steps 1002-1014 of the method 1000. Such components may perform one or more of the steps 1002-1014 according to the functionality as described above in relation to FIGS. 1-9.

While the making and using of various embodiments of the present disclosure are discussed in detail herein, it should be appreciated that the present disclosure provides many applicable inventive concepts that are embodied in a wide variety of specific contexts. The specific embodiments discussed herein are merely illustrative of specific ways to make and use the disclosure and do not delimit the scope of the disclosure. Those of ordinary skill in the art will recognize numerous equivalents to the specific apparatuses, systems, and methods described herein. Such equivalents are considered to be within the scope of this disclosure and may be covered by the claims.

Furthermore, the described features, structures, or characteristics of the disclosure may be combined in any suitable manner in one or more embodiments. In the description contained herein, numerous specific details are provided, such as examples of programming, software, user selections, hardware, hardware circuits, hardware chips, or the like, to provide understanding of embodiments of the disclosure. One skilled in the relevant art will recognize, however, that the disclosure may be practiced without one or more of the specific details, or with other methods, components, materials, apparatuses, devices, systems, and so forth. In other instances, well-known structures, materials, or operations may not be shown or described in detail to avoid obscuring aspects of the disclosure.

These features and advantages of the embodiments will become more fully apparent from the description and appended claims, or may be learned by the practice of embodiments as set forth herein. As will be appreciated by one skilled in the art, aspects of the present disclosure may be embodied as an apparatus, system, method, computer program product, or the like. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present disclosure may take the form of a computer program product embodied in one or more computer-readable media having program code embodied thereon.

In some embodiments, a module may be implemented as a hardware circuit comprising custom (very large-scale integration) VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the program code may be stored and/or propagated on in one or more computer-readable media.

In some embodiments, a module may include a smart contract hosted on a distributed ledger network, such as the distributed ledger network 102. The functionality of the smart contract may be executed by a node 104 (or peer) of the distributed ledger network. One or more inputs to the smart contract may be read or detected from one or more distributed ledger records 204 stored on or referenced by the distributed ledger. The smart contract may output data based on the execution of the smart contract as one or more distributed ledger records 410 to the distributed ledger. A smart contract may implement one or more methods or algorithms described herein.

The computer program product may include a computer-readable storage medium (or media) having computer-readable program instructions thereon for causing a processor to carry out aspects of the present disclosure. The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium may include a portable computer diskette, a random access memory ("RAM"), a read-only memory ("ROM"), an erasable programmable read-only memory ("EPROM" or Flash memory), a static random access memory ("SRAM"), a hard disk drive ("HDD"), a solid state drive, a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present disclosure.

Aspects of the present disclosure are described herein with reference to flowchart illustrations or block diagrams of methods, apparatuses, systems, algorithms, or computer program products according to embodiments of the disclosure. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The schematic flow chart diagrams included herein are generally set forth as logical flow chart diagrams. As such, the depicted order and labeled steps are indicative of one embodiment of the presented method. Other steps and methods may be conceived that may be equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The schematic flowchart diagrams and/or schematic block diagrams in the Figures illustrate the architecture, functionality, and operation of possible implementations of apparatuses, systems, methods and computer program products according to various embodiments of the present disclosure. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

As can be seen from the above disclosure, the systems and methods disclosed herein provide improvements to the functioning of computers and other technology and technical fields, including the field of data privacy. First, the systems and methods disclosed increase security by using a distributed ledger network 102 to record data exchanges that occur via the data exchange platform 110. The distributed ledger network 102 may be encrypted or permissioned. This may prevent unauthorized users from viewing the distributed ledger records 204 and adding new distributed ledger records 410 to the ledger. The distributed ledger records 410 are immutable once added to the distributed ledger, which provides secure and decentralized proof that a certain activity took place on the data exchange platform 110. Such activity includes the data exchange platform 110 recording on the distributed ledger network 102 that a data consumer user has been granted access to a certain data asset 408.

Second, the systems and methods disclosed herein provide increased data privacy to both data provider users and data consumer users of the data exchange platform 110. By de-identifying or aggregating data in received datasets 406, the data provided by data provider users is better protected. The data exchange platform 110 prevents the data provider users from knowing who gains access to their provided data, and the data exchange platform 110 prevents the data consumer users from knowing whose data they are gaining access to. This is accomplished, among other ways, by the specific content that the data exchange platform 110 includes the distributed ledger record 410, which solves the problem of the distributed ledger being both open to users of the platform whiles still providing anonymity.

Third, the systems and methods disclosed herein provide for artificial intelligence, machine learning, and other data analytics models 310 to train on data assets 408 in order to improve these models' accuracy at evaluating current and future data assets 408. As described herein, data assets 408 stored by the data exchange platform 110 are used to generate training data sets. These training data sets are fed into the data analytics models 310 to train them, causing them to be more accurate. The specific training data features described herein provide improved accuracy during such training.

Thus, although there have been described particular embodiments of the present disclosure of a new and useful SYSTEMS AND METHODS FOR DISTRIBUTED LEDGER-BASED DATA EXCHANGE, it is not intended that such references be construed as limitations upon the scope of this disclosure.

What is claimed is:

1. A non-transitory computer-readable storage medium having executable instructions stored thereon, wherein the executable instructions, when executed by a processor, are configured to:
    establish a connection, over a data network, to a node of a distributed ledger network that maintains a distributed ledger, wherein the distributed ledger includes a cryptographically secure plurality of distributed leger records;
    obtain, over the data network, a first dataset from a first user;
    perform pre-processing on the first dataset to generate a first data asset based on the first dataset;
    store the first data asset;
    calculate a first value for the first data asset;
    generate a first data proposition based on the first data asset, wherein the first data proposition includes
      the first value for the first data asset, and
      a description of the first data asset;
    obtain, over the data network, acceptance data from a second user, wherein the acceptance data includes data indicating acceptance by the second user of the first data proposition; and
    transmit, over the data network, a first distributed ledger record to the node of the distributed ledger network, wherein the first distributed ledger record includes data based on the acceptance data.

2. The computer-readable storage medium of claim 1, wherein performing the preprocessing on the first dataset includes modifying the dataset, wherein modifying the dataset comprises at least one of:
    removing personally identifying data from the first dataset;
    shifting a time in the first dataset by a random amount; or
    aggregating a plurality of data records in the first dataset.

3. The computer-readable storage medium of claim 1, wherein the executable instructions, when executed by a processor, are further configured to:
    obtain a first hash based on the first data asset;
    generate a second distributed ledger record that includes the first hash; and
    send the second distributed ledger record over the data network to the node of the distributed ledger network.

4. The computer-readable storage medium of claim 3, wherein the executable instructions, when executed by a processor, are further configured to:
    make the first data asset available to the second user;
    obtain a second hash based on the first data asset available to the second user;
    obtain the first hash from the distributed ledger network; and
    verify that the first hash matches the second hash.

5. The computer-readable storage medium of claim 1, wherein:
    obtaining the first dataset includes decrypting the dataset using a first cryptographic key; and
    storing the first dataset includes encrypting the dataset using a second cryptographic key.

6. The computer-readable storage medium of claim 1, wherein the executable instructions, when executed by a processor, are further configured to:
    in response to obtaining the acceptance data from the second user, send a notification to a third user; and
    in response to obtaining approval data from the third user, transmit the first distributed ledger record to the node of the distributed ledger network.

7. The computer-readable storage medium of claim 1, wherein the executable instructions, when executed by a processor, are further configured to permit a third user to view the plurality of distributed ledger records of the distributed ledger network, wherein the third user includes a governmental regulatory body.

8. The computer-readable storage medium of claim 1, wherein calculating the first value for the first data asset comprises determining an initial value as the first value.

9. The computer-readable storage medium of claim 8, wherein the executable instructions, when executed by a processor, are further configured to, in response to a predetermined amount of time elapsing since calculating the first value, calculating a second value for the first data asset by adjusting the initial value based on a number of users with a subscription to the first data asset.

10. The computer-readable storage medium of claim 1, wherein the executable instructions, when executed by a processor, are further configured to:
    construct a training dataset based on a plurality of data assets, wherein
      the plurality of data assets includes the first data asset,
      the training dataset includes a plurality of training records, and
      a training record of the plurality of training records includes a current value for a corresponding data asset; and
    train a data analytics model on the training dataset.

11. The computer-readable storage medium of claim 10, wherein calculating the first value for the first data asset comprises performing an inferencing calculation, using the data analytics model, to obtain the first value for the first data asset.

12. A system, comprising:
    a distributed ledger network node configured to maintain a distributed ledger, wherein the distributed ledger includes a cryptographically secure plurality of distributed ledger records; and
    a server including a computer-readable storage medium having executable instructions stored thereon, and a processor, wherein in response to being executed by the processor, the executable instructions are configured to
      establish a connection, over a data network, to the distributed ledger network node,
      obtain, over the data network, a first dataset from a first user,
      perform pre-processing on the first dataset to generate a first data asset based on the first dataset,
      store the first data asset,
      calculate a first value for the first data asset, generate, on a data exchange platform hosted on the server, a first data proposition based on the first data asset, wherein the first data proposition includes the first value for the first data asset, and a description of the first data asset, obtain, over the data network, acceptance data from a second user, wherein the acceptance data includes data indicating acceptance by the second user of the first data proposition, and transmit, over the data network, a first distributed ledger record to the node of the distributed ledger network, wherein the first distributed ledger record includes data based on the acceptance data.

13. The system of claim 12, wherein the first dataset comprises at least one of:

pharmaceutical data;

prescription data; or purchasing data.

14. The system of claim 12, wherein the first dataset comprises at least one of:

an electronic health record (EHR);

inventory management data; or data from a smart cabinet.

15. The system of claim 12, wherein the distributed ledger network comprises a permissioned distributed ledger network.

16. A computer-implemented method for distributed ledger-based data exchange, the method comprising:

establishing a connection, over a data network, to a node of a distributed ledger network that maintains a distributed ledger, wherein the distributed ledger includes a cryptographically secure plurality of distributed ledger records;

obtaining, over the data network, a first data asset from a first user;

storing the first data asset;

calculating a first value for the first data asset by performing an inference calculation using a machine learning model;

generating a first data proposition based on the first data asset, wherein the first data proposition includes the first value for the first data asset, and a description of the first data asset;

obtaining, over the data network, acceptance data from a second user, wherein the acceptance data includes data indicating acceptance by the second user of the first data proposition; and transmitting, over the data network, a first distributed ledger record to the node of the distributed ledger network, wherein the first distributed ledger record includes data based on the acceptance data.

17. The method of claim 16, wherein calculating the first value for the first data asset comprises determining an initial value as the first value.

18. The method of claim 17, further comprising, in response to a predetermined amount of time elapsing since calculating the first value, calculating a second value for the first data asset by adjusting the initial value based on a number of users with a subscription to the first data asset.

19. The method of claim 16, further comprising:

in response to obtaining the first data asset from the first user, generating a second distributed ledger record, including an identifier for the first user, and a data asset hash, wherein the data asset hash includes a hash based on the first data asset; and transmitting, over the data network, the second distributed ledger record to the node of the distributed ledger network.

20. The method of claim 16, wherein the first distributed ledger record includes an identifier for the second user.

* * * * *